(12) United States Patent
Nakamura et al.

(10) Patent No.: US 7,016,125 B2
(45) Date of Patent: Mar. 21, 2006

(54) OBJECTIVE LENS-DRIVING APPARATUS

(75) Inventors: Keiji Nakamura, Kyoto (JP); Mitoru Yabe, Kyoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/644,029

(22) Filed: Aug. 20, 2003

(65) Prior Publication Data

US 2005/0076353 A1    Apr. 7, 2005

Related U.S. Application Data

(62) Division of application No. 10/246,398, filed on Sep. 19, 2002, now Pat. No. 6,687,062.

(30) Foreign Application Priority Data

Nov. 12, 2001 (JP) .............................. 2001-345782

(51) Int. Cl.
*G02B 7/02* (2006.01)
*G11B 7/00* (2006.01)

(52) U.S. Cl. ............. 359/814; 359/813; 359/824; 369/44.21; 369/44.19; 369/44.32; 369/44.14; 369/44.15; 369/44.16

(58) Field of Classification Search ............ 359/813, 359/814, 824; 369/44.19, 44.21, 44.32, 44.14, 369/44.15, 44.16
See application file for complete search history.

(56) References Cited

U.S. PATENT DOCUMENTS

| | | | |
|---|---|---|---|
| 4,473,274 A | 9/1984 | Yano et al. | |
| 4,752,117 A | 6/1988 | Ichikawa et al. | |
| 5,046,820 A | 9/1991 | Saekusa et al. | |
| 5,105,405 A | 4/1992 | Hashimoto et al. | |
| 5,206,762 A | 4/1993 | Kasahara et al. | |
| 5,319,497 A | 6/1994 | Wakabayashi et al. | |
| 5,479,386 A | 12/1995 | Takeshita et al. | |
| 5,506,732 A | 4/1996 | Mori | |
| 5,513,047 A | 4/1996 | Matsui | |
| 5,541,898 A | 7/1996 | Kasuga et al. | |
| 5,646,789 A | 7/1997 | Lee | |
| 5,659,525 A | 8/1997 | Miyamae et al. | |
| 5,920,437 A | 7/1999 | Shirotori | |
| 5,999,342 A | 12/1999 | Okada et al. | |
| 6,195,314 B1 | 2/2001 | Inui et al. | |

(Continued)

FOREIGN PATENT DOCUMENTS

JP    58-175143 A    10/1983

(Continued)

*Primary Examiner*—Georgia Epps
*Assistant Examiner*—Jack Dinh
(74) *Attorney, Agent, or Firm*—Birch, Stewart, Kolasch & Birch, LLP

(57) ABSTRACT

An objective lens driving apparatus is used for accurately positioning an abject to focus a light spot on an optical recording medium. A lens holder holds the objective lens and has a bearing hole through which a shaft extends in a direction parallel to the optical axis so that the lens holder is rotatably supported on the shaft. Two magnets are supported on the lens holder so that the shaft is between the magnets. A base has two magnetic members disposed such that each of the two magnets exerts an attraction force on a corresponding one of the two magnetic members to urge the lens holder in a direction of the optical axis and in a direction perpendicular to the optical axis. A first coil set of first focusing and tracking coils and a second coil set of focusing and tracking coils are mounted to the two magnetic members.

8 Claims, 22 Drawing Sheets

U.S. PATENT DOCUMENTS

| | | |
|---|---|---|
| 6,212,019 B1 | 4/2001 | Yokouchi |
| 6,295,255 B1 | 9/2001 | Seo et al. |
| 6,341,104 B1 | 1/2002 | Yamaguchi et al. |
| 6,385,146 B1 * | 5/2002 | Choi et al. ............... 369/44.16 |
| 6,418,094 B1 | 7/2002 | Ozawa et al. |

FOREIGN PATENT DOCUMENTS

| | | |
|---|---|---|
| JP | 62-058430 A | 3/1987 |
| JP | 63-135519 U | 9/1988 |
| JP | 2-096933 A | 4/1990 |
| JP | 2-195522 A | 8/1990 |
| JP | 4-45891 B | 7/1992 |
| JP | 5-197984 A | 8/1993 |
| JP | 7-19388 B | 3/1995 |
| JP | 10/172158 A | 6/1998 |
| JP | 10-241174 A | 9/1998 |
| JP | 3323699 B2 | 6/2002 |
| JP | 2003-203372 A | 7/2003 |

* cited by examiner

FIG. 20
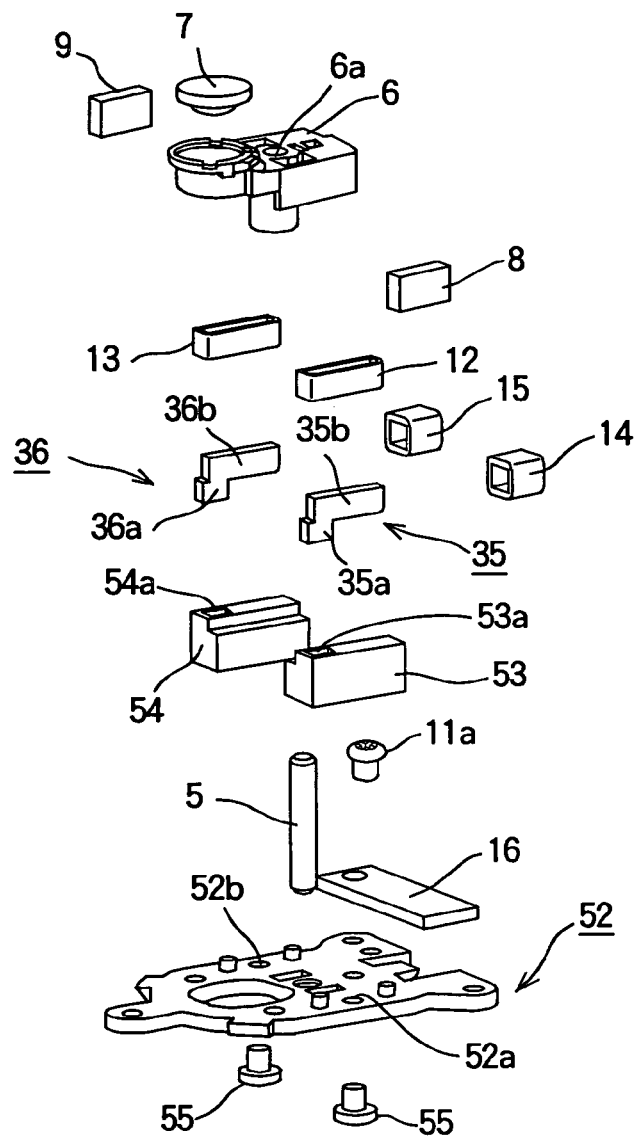
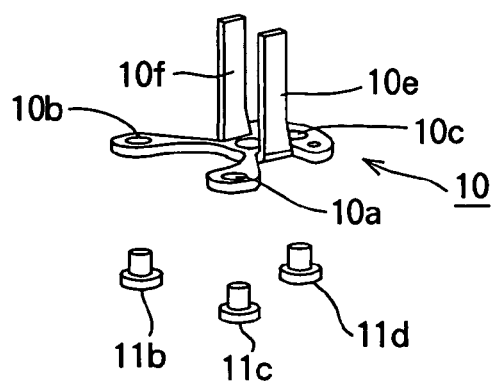

OBJECTIVE LENS-DRIVING APPARATUS

This application is a divisional of application Ser. No. 10/246,398, filed on Sep. 19, 2002, now U.S. Pat. No. 6,687,062 the entire contents of which are hereby incorporated by reference and for which priority is claimed under 35 U.S.C. § 120; and this application claims priority of application Ser. No. 2001-345782 filed in Japan on Nov. 12, 2001 under 35 U.S.C. § 119.

BACKGROUND OF THE INVENTION

1. Field of the Invention

This invention relates to an objective lens-driving apparatus that controllably corrects errors in tracking grooves or pits formed in an optical recording medium such as an optical disk. The invention also relates to an objective lens-driving apparatus that controllably corrects errors in focusing a beam of light on an optical recording medium such as an optical disk.

2. Description of the Related Art

When signals are recorded onto or reproduced from an optical recording medium through an objective lens, a control is required to position the objective lens in such a way that a light spot is always focussed on the recording grooves or pits accurately. Many of such objective lens-driving apparatuses are of a moving coil type.

However, the moving coil type requires a means for supplying electric power from a stationary part of the apparatus to a coil on a movable part. This power supplying means adversely affects the drive characteristic of the objective lens-driving apparatus, preventing the objective lens from being highly accurately positioned. In addition, the coil requires to be electrically connected to the power supplying means but this electrical connection is rather difficult.

In order to solve these problems, for example, Japanese Patent Hei No. 7-19388 proposes a moving magnet type objective lens driving apparatus.

FIG. 25 is a perspective view, with a partially cutaway view, of a pertinent portion of the conventional apparatus disclosed in Japanese Patent Hei No. 7-19388.

Referring to FIG. 25, flat focusing coils 124a and 124b and flat tracking coils 125a and 125b are wound generally in a flat plane, and securely supported by walls 103a and 103b in opposing vertical planes. The walls 103a and 103b are in one-piece construction with a base 101. A lens holder 110 is rotatably supported on a shaft 109 securely fixed to the base 101, and supports an objective lens 113 and magnets 116a and 116b thereon.

A supporting spring 118 is in the shape of a square loop and maintains the lens holder 110 at its neutral position. A pair of opposing sides of the spring 118 is fixed to the lens holder 110 and another pair of opposing sides engages retaining plates 107 and 107b (only 107b is depicted) to be fixed to the base 101.

When a focus error is corrected, a predetermined electric current is run through the focusing coils 124a and 124b to create an electromagnetic force acting between the current and the magnetic field emanating from the magnets 116a and 116b for focusing control. This electromagnetic force drives the lens holder 110 in a direction perpendicular to the surface of the optical recording medium.

When a tracking error is corrected, a predetermined electric current is run through the tracking coils 125a and 125b so that the lens holder 110 is driven in a direction transverse to the track in the optical recording medium for tracking control.

The aforementioned conventional objective lens driving apparatus requires the spring 118 that supports the lens holder rotatably and holds the objective lens at its neutral position. The use of the spring 118 increases the number of components and makes the assembly operation of the apparatus complex.

A magnetic circuit is formed of only the magnets 116a and 116b and therefore the magnetic field generated by the magnetic circuit is rather weak. As a result, this conventional apparatus makes drive sensitivity low and requires more electric power accordingly.

A small gap between the support shaft 109 and lens holder 110 can cause rattling of the lens holder 110 and/or tilting and vibration of the objective lens 113.

SUMMARY OF THE INVENTION

An object of the present invention is to solve the aforementioned problems.

An object of the invention is to provide an objective lens driving apparatus that requires no specific component to keep the objective lens at its neutral position and facilitates assembly operation of the apparatus.

Another object of the invention is to provide an objective lens driving apparatus where mechanical vibration due to the gaps between bearings is minimized during operation.

A still another object is to provide an objective lens driving apparatus where drive sensitivity of a lens holder is increased, thereby implementing a low-power consumption operation.

An objective lens driving apparatus is used for positioning an objective lens accurately to form a light spot on grooves or pits on an optical recording medium. An objective lens has an optical axis and focusing light emitted from a light source on an information-recording medium. A lens holder holds the objective lens and having a bearing hole that extends in a direction parallel to the optical axis. A shaft is inserted into the bearing hole so that the lens holder is rotatably supported on the shaft. A pair of magnets supported on the lens holder, the magnets being diametrically opposite to one another with respect to the shaft. A base is made of a magnetic material and has a pair of coil-supporting yokes. The pair of coil-supporting yokes are disposed such that each of the pair of magnets exerts an attraction force on a corresponding one of the pair of portions to urge the lens holder both in a direction of the optical axis and in a direction perpendicular to the optical axis. A first set of first focusing coil and tracking coil and a second set of focusing coil and tracking coil are mounted to the pair of portions of the base. The first and second sets are diametrically opposite with respect to the shaft in such a way that the pair of magnets are between the first and second sets.

The objective lens driving apparatus further includes the focusing coil of each of the first and second sets has a first axis of coil, and the tracking coil of each of the first and second sets has a second axis of coil substantially perpendicular to the first axis of coil. When a first current flows through the focusing coil of each of the first set and second set, an urging force in a direction parallel to the shaft is generated between a corresponding magnet and the focusing coil. When a current flows through the tracking coil of each of the first set and second set, an urging force in a direction substantially perpendicular to the shaft is generated between a corresponding magnet and the tracking coil.

An objective lens driving apparatus is used for positioning an objective lens accurately to form a light spot on grooves or pits on an optical recording medium. An objective lens has an optical axis and focuses light emitted from a light source on an information recording medium. A lens holder holds the objective lens and has a bearing hole that extends in a direction parallel to the optical axis. A shaft is inserted into the bearing hole so that the lens holder is rotatably supported on the shaft. A pair of magnets are supported on the lens holder and diametrically opposite to one another with respect to the shaft. A pair of coil-supporting yokes are made of a magnetic material. A base is made of a non-magnetic material and holds the pair of coil supporting yokes. The coil supporting yokes are disposed such that each of the pair of magnets exerts an attraction force on a corresponding one of the pair of portions to urge the lens holder both in a direction of the optical axis and in a direction perpendicular to the optical axis. A first set of first focusing coil and tracking coil and a second set of focusing coil and tracking coil are mounted to the pair of portions of the base. The first and second sets are diametrically opposite with respect to the shaft in such a way that the pair of magnets are between the first and second sets.

An objective lens driving apparatus is used for positioning an objective lens accurately to form a light spot on grooves or pits on an optical recording medium. An objective lens has an optical axis and focusing light emitted from a light source on an information-recording medium. A lens holder holds the objective lens and has a bearing hole (6a) that extends in a direction parallel to the optical axis. Two magnets are supported on the lens holder and are diametrically opposite to one another with respect to the shaft. A shaft is inserted into the bearing hole so that the lens holder is rotatably supported on the shaft. Two coil-supporting yokes are made of a magnetic material. Two yoke carrying members are made of a non-magnetic material. Each of the pair of supporting yokes holds a corresponding one of the pair of coil supporting yokes. A base is made of a non-magnetic material and has the shaft. The base has a pair of magnetic portions disposed such that each of the two magnets exerts an attraction force on a corresponding one of the pair of magnetic portions. Thus, the lens holder is urged both in a direction of the optical axis and in a direction perpendicular to the optical axis. A first set of first focusing coil and tracking coil and a second set of focusing coil and tracking coil are mounted to the pair of portions of the base.

The first and second sets are diametrically opposite with respect to the shaft in such a way that the pair of magnets are between the first and second sets.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 20 is an exploded perspective view of the apparatus shown in FIG. 12;

DETAILED DESCRIPTION OF THE PREFERRED EMBODIMENTS

First Embodiment

{Construction}

Figure 1:
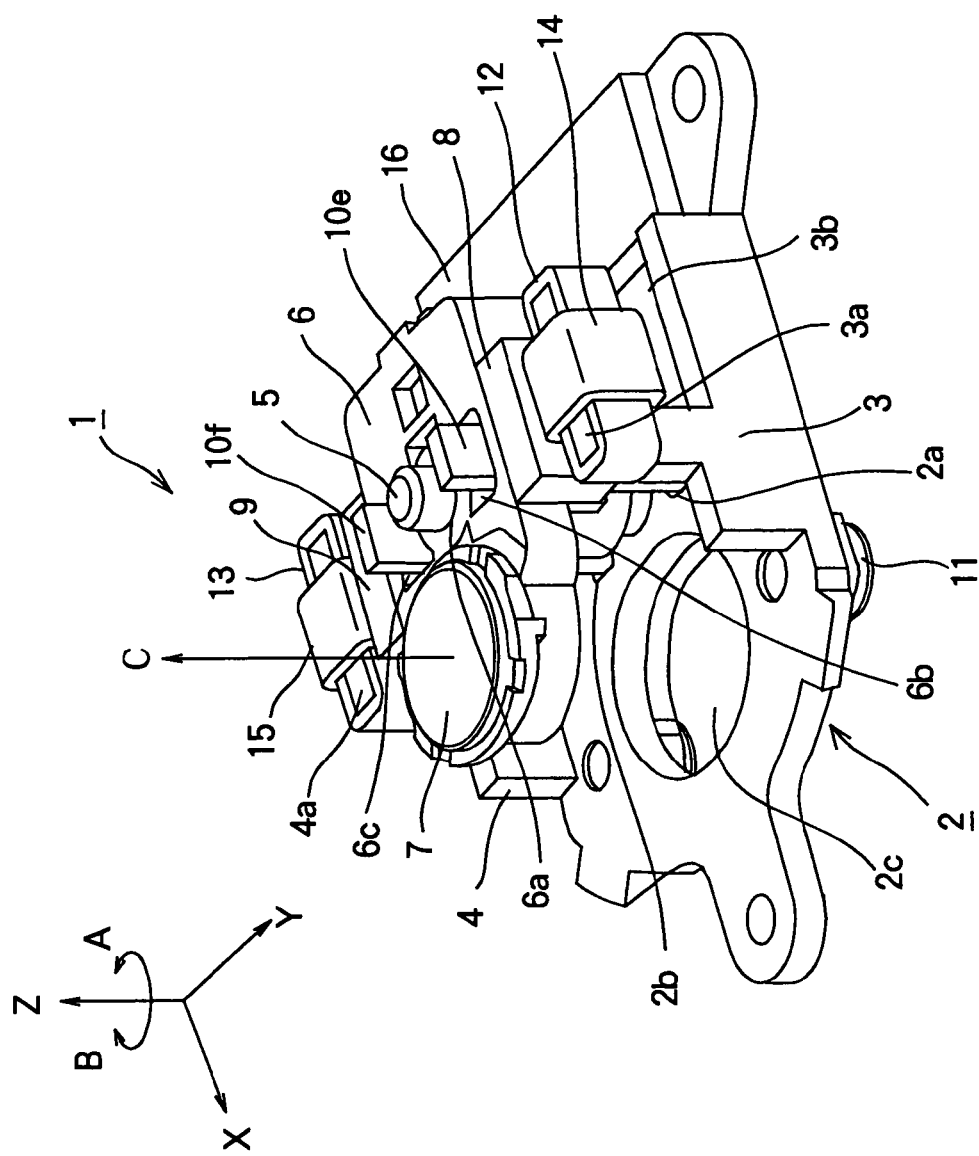
FIG. 1 is a perspective view, illustrating a configuration of an objective lens driving apparatus according to a first embodiment.

FIG. 1 is a perspective view, illustrating a configuration of an objective lens driving apparatus according to a first embodiment.

Figure 2:
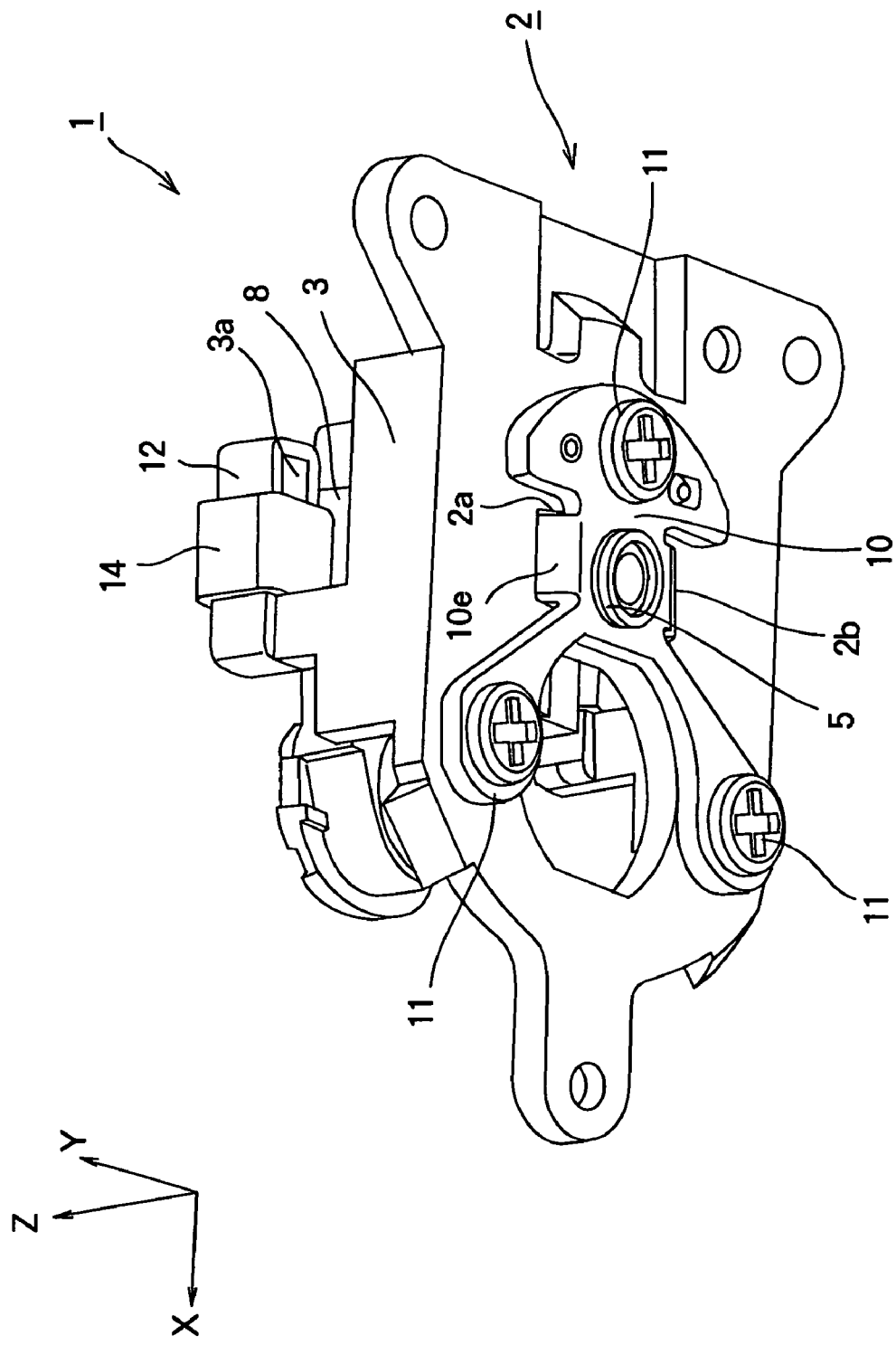
FIG. 2 is a perspective view, illustrating the bottom portion of the apparatus shown in FIG. 1.

FIG. 2 is a perspective view, illustrating the bottom portion of the apparatus shown in FIG. 1.

Referring to FIGS. 1 and 2, a Z-axis is a direction parallel to the shaft 5, an X-axis is a direction perpendicular to the Z-axis, and a Y-axis is a direction perpendicular to the X-axis and Z-axis.

Referring to FIGS. 1 and 2, an objective lens driving apparatus 1 has a base 2 made of a magnetic material coated with a fluoroplastics having a small friction coefficient. The base 2 has side walls 3 and 4 at opposite ends thereof and a supporting shaft 5 extends from a middle of the base 2.

A lens holder 6 is made of a light-weight, highly rigid plastics, and has a bearing hole 6a formed in the middle thereof. The supporting shaft 5 extends through the bearing hole 6a and is rotatably supported. The holder 6 supports an objective lens 7 at a position eccentric to the shaft 5 in such a way that the optical axis of the objective lens 7 is parallel to the Z-axis.

L-shaped coil-supporting yokes 3a and 4a are formed on top of the side walls 3 and 4. Each of the coil-supporting yokes 3a and 4a has a long free portion that extends in the X-axis. Magnets 8 and 9 are disposed to oppose the long free portions of the coil-supporting yokes 3a and 4a, respectively. When the lens holder 6 is at its neutral position, the optical axis of the objective lens 7 and the rotational axis (i.e., the shaft 5) of the objective lens 7 lie in a plane parallel to the X-axis.

Figure 3:
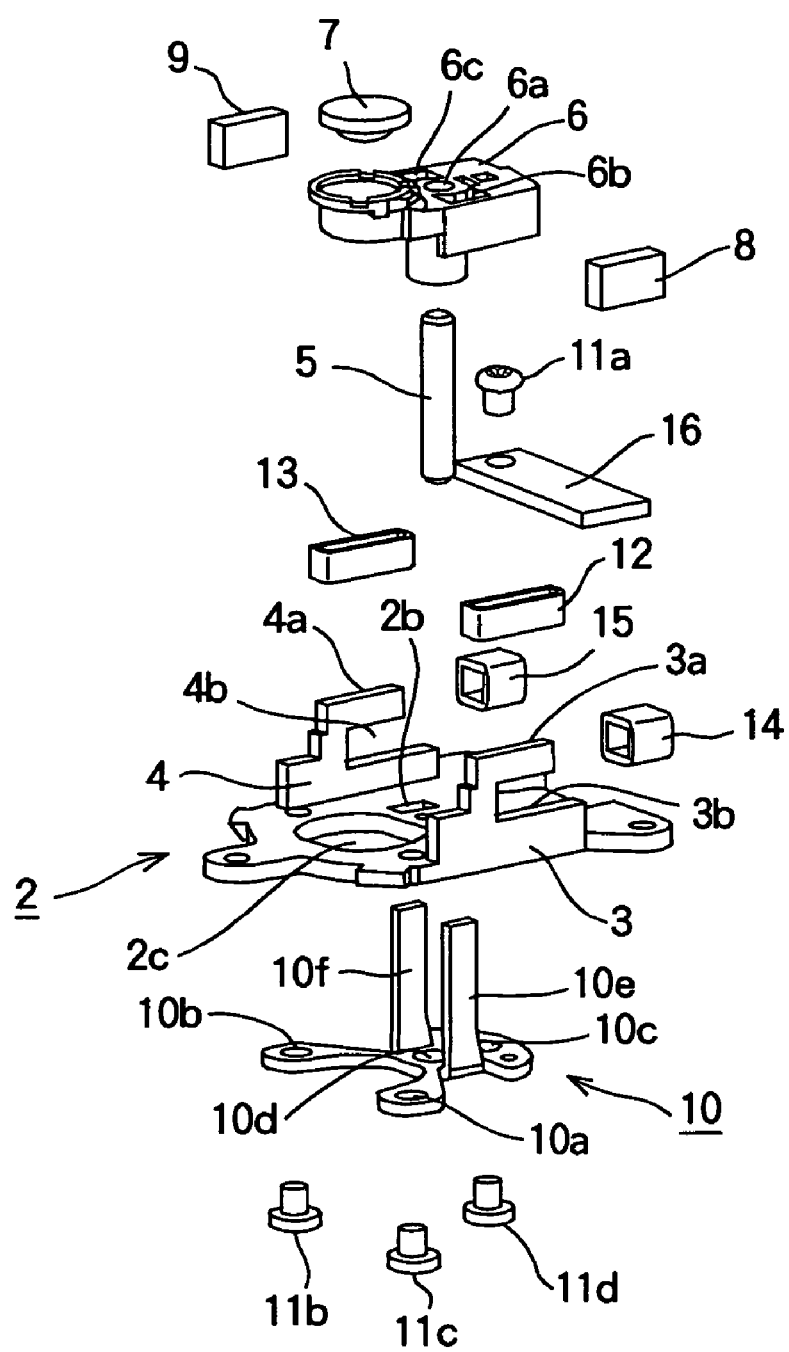
FIG. 3 is an exploded perspective view of the apparatus shown in FIG. 1.

FIG. 3 is an exploded perspective view of the apparatus shown in FIG. 1.

A yoke 10 is formed of a magnetic material and has a base and a pair of magnetic paths 10e and 10f that extend from the base and oppose each other. The base has screw holes 10a–10c and a positioning hole 10d formed therein. The magnetic paths 10e and 10f are assembled in such a way that the magnetic paths 10e and 10f extend through openings 2a and 2b formed in the base 2 and clearance holes 6b and 6c formed in the lens holder 6, respectively. Each of the magnetic paths 10e and 10f is fixed to the outer bottom surface of the base 2 by means of three screws 11b–11d.

Figure 4:
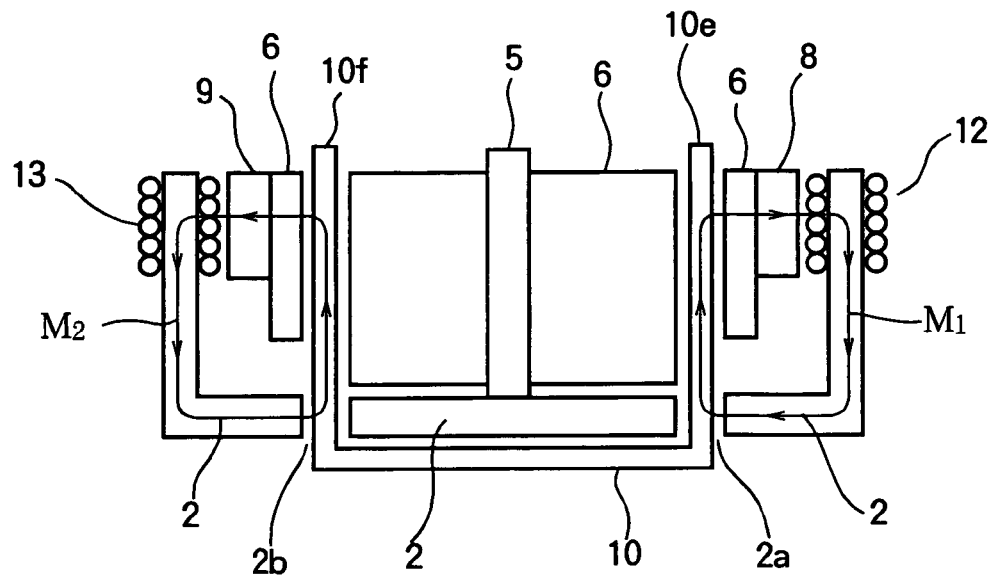
FIG. 4 illustrates a magnetic circuit of the first embodiment.

FIG. 4 illustrates a magnetic circuit of the first embodiment.

Upon attaching the yoke 10 to the base 2, a magnetic circuit is defined which includes the coil-supporting yoke 3a, base 2, and magnetic path 10e and surrounds the magnet 8. A magnetic flux M1 flows through the magnetic path. Also, another magnetic circuit is defined which includes the arm 4a, base 2, and magnetic path 10f and surrounds the magnet 8. A magnetic flux M2 flows through the magnetic path. In FIG. 4, the tracking coils 14 and 15 are omitted for simplicity.

Figure 5:
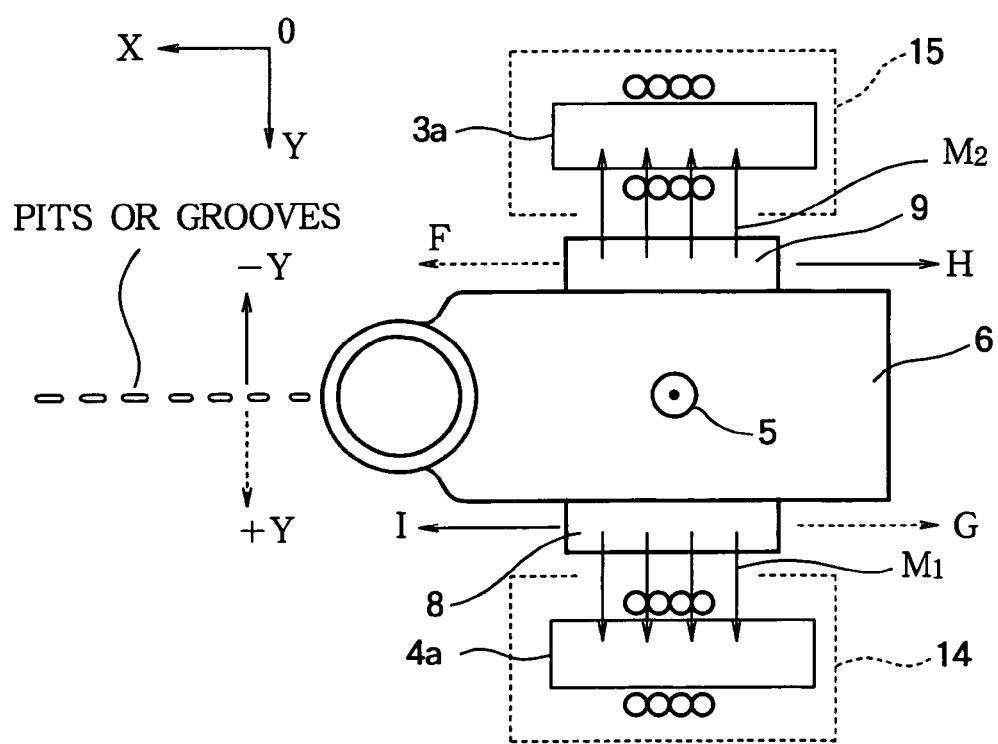
FIG. 5 illustrates the operation of the objective lens driving apparatus according to the first embodiment when the lens holder is driven in an X-Y plane.

FIG. 5 illustrates the operation of the objective lens driving apparatus according to the first embodiment when the lens holder is driven in an X-Y plane.

Figure 6:
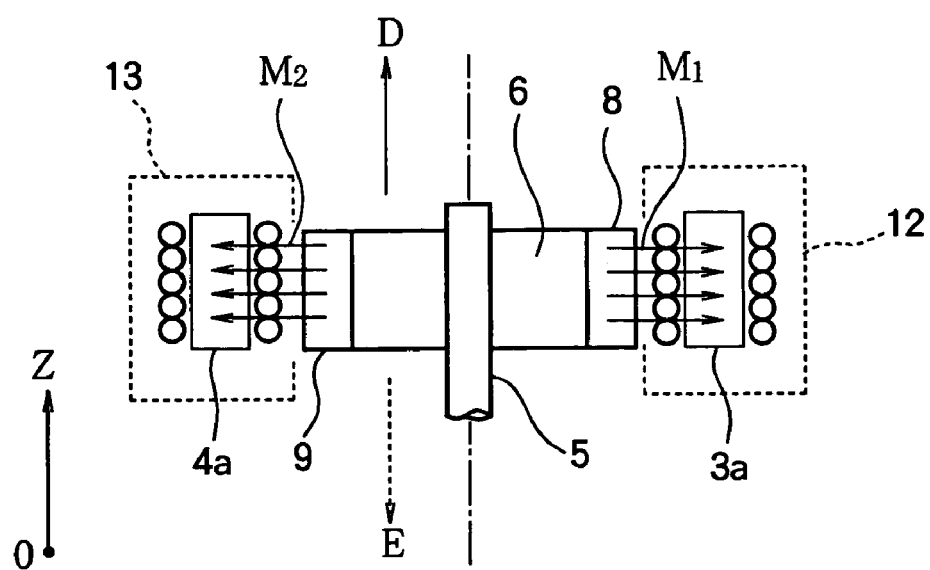
FIG. 6 illustrates the operation of the objective lens driving apparatus according to the first embodiment when the lens holder is driven in the Z-axis.

FIG. 6 illustrates the operation of the objective lens driving apparatus according to the first embodiment when the lens holder is driven in the Z-axis.

Referring to FIGS. 5 and 6, the base 2 has a pair of coil-supporting yokes 3a and 4a disposed. The magnetic flux M1 and M2 flow through the tracking coils 14 and 15. The magnets 8 and 9 exert attraction forces on the pair of coil-supporting yokes 3a and 4a to urge the lens holder 6 both in a direction of the optical axis C (parallel to the Z-axis) and in a direction (parallel to the X-axis) perpendicular to the optical axis C.

Referring to FIG. 5, upon assembly of the apparatus, the lens holder 6 is urged in a negative X-axis by a component in the X-axis of the resultant force of two forces. The two forces are an attraction force in a direction shown by arrow H acting between the magnet 8 and the coil-supporting yoke 3a and an attraction force in a direction shown by arrow G acting between the magnet 9 and coil-supporting yoke 4a.

Referring to FIG. 6, a balance is achieved between the weight of the lens holder 6 and a component in the Z-axis of the resultant force of two forces. Thus, the lens holder 6 s suspended at its neutral position. The two forces are the attraction forces acting between the magnet 8 and the coil-supporting yoke 3a and between the magnet 9 and coil-supporting yoke 4a. The resultant force is in a direction shown by arrow D. When the lens holder 6 is displaced from the neutral position in directions shown by arrows D and E, a force tending to return to the neutral position is generated in accordance with a change in the magnetic field or magnetic flux M1 and M2 in the magnetic circuit.

Referring back to FIG. 1, the focusing coils 12 and 13 are wound on the coil-supporting yokes 3a and 4a, respectively, in such a way that the focusing coils are wound about axes parallel to the Z-axis. The tracking coils 14 and 15 are wound on the focusing coils 12 and 13, respectively, in such a way that the tracking coils are wound about axes parallel to the X-axis.

The base 2 has an opening 2c through which a beam of light emitted from a light source, not shown, passes. The opening 2c is larger than an area in which the objective lens 7 moves in the X-Y plane. A relay terminal board 16 is fixedly mounted by a screw 11 (FIG. 3) to the base 2, the relay terminal board 16 relaying the electrical connection of lead lines from the focusing coils 12 and 13 and tracking coils 14 and 15.

{Operation}

The operation for holding the lens holder at the neutral position will be described.

When the lens holder 6 displaces from the neutral position in the Z-axis, a force tending to return to the neutral position is generated in accordance with a change in the magnetic field in the magnetic circuit.

The characteristic of this force depends greatly on the shape of the cutouts 3b and 4b formed in the side walls 3 and 4, respectively. The shape of the cutouts 3b and 4b is selected such that when the focusing of the objective lens 7 is corrected, the force acting on the lens holder varies linearly within the range (usually ±1 mm) in which the objective lens 7 should move. For example, the length of the cutouts 3b and 4b in the Z-axis should be greater than the aforementioned range in which the objective lens 7 moves.

When the lens holder 6 rotates from the neutral position in directions shown by arrows A and B about the Z-axis, the magnetic field in the magnetic circuit changes to create a force in accordance with the amount of rotation of the lens holder 6. This force causes the lens holder 6 to return to the neutral position. The characteristic of this force depends greatly on the length and position of the long free portions of the coil-supporting yokes 3a and 4a. The shape of the long free portions of the coil-supporting yokes 3a and 4a are selected such that when the tracking error of the objective lens 7 is corrected, the force acting on the lens holder varies linearly within the range (usually ±0.5 mm) in which the objective lens 7 should move.

As described above, when no external force is applied to the lens holder 6, the lens holder 6 is urged somewhat in the negative X-axis but remains balanced at the neutral position. This urging force presses the inner wall of the bearing 6a against the shaft 5, preventing a gap from being created between the bearing 6a and the shaft 5. Thus, the rattling of the lens holder 6 is minimized when the lens holder 6 rotates.

The focusing operation and tracking operation will be described with reference to FIGS. 5 and 6.

The light emitted from the light source passes the opening 2c and enters the objective lens 7 in a direction as shown by arrow C (FIG. 1). The objective lens 7 focuses the light on the recording surface of the optical recording medium disposed above the objective lens 7, thereby forming a spot of light on the recording surface. The optical recording medium is positioned such that when the grooves or pits of the rotating recording medium pass the objective lens 7, the direction of circumferential velocity of the track of the grooves or pits is substantially parallel to the X-axis.

When a focus error is corrected, currents are run through the focusing coils 12 and 13 to create electromagnetic forces that act between the currents and the magnetic fields (magnetic fluxes M1 and M2) emanating from the magnets 8 and 9. The electromagnetic forces cause the lens holder 6 (i.e., objective lens 7) to displace relative to the optical recording medium in D and E directions (Z-axis). In this manner, the focusing control of the objective lens 7 is carried out.

When a tracking error is corrected, currents are run through the tracking coils 14 and 15 to create electromagnetic forces that act between the current and the magnetic fields (magnetic flux M1 and M2) emanating from the magnets 8 and 9. An electromagnetic force acts in directions shown by arrows F and G, thereby causing the lens holder 6 to rotate about the shaft 5 in directions shown by arrow +Y. Another electromagnetic force acts in directions shown by arrows H and I, thereby causing the lens holder 6 to rotate about the shaft 5 in directions shown by arrow −Y. The +Y direction and −Y direction are substantially transverse to the direction of the track (pits or grooves) of the optical recording medium. In this manner, the tracking control of the objective lens 7 is carried out.

As described above, the magnets 8 and 9, base 2 including the coil-supporting yokes 3a and 4a, and yoke 10 form a magnetic circuit. The magnetic circuit operates to support the objective lens 7 of the movable magnet type at its neutral position. The use of a magnetic force eliminates separate components such as supporting springs of the conventional art, thereby reducing the number of components as well as facilitating the assembly of the apparatus.

As described above, the bearing hole 6a formed in the lens holder 6 is pressed against the shaft 5 by the magnetic force. This makes the lens holder 6 rattle-free, so that the lens holder 6 (i.e., objective lens 7) will not tilt and/or vibrate.

Second Embodiment

Figure 7:
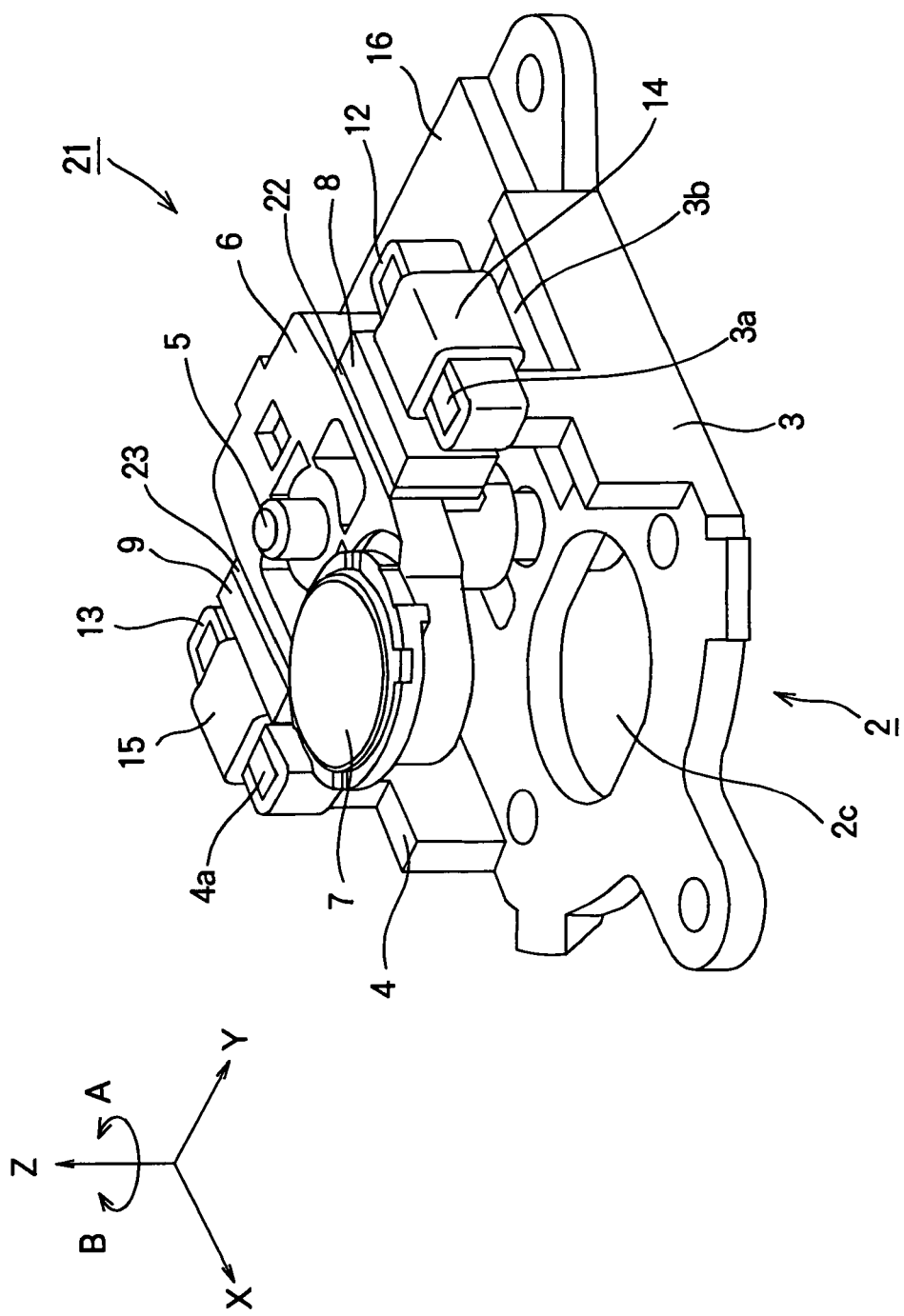
FIG. 7 is a perspective view illustrating the general configuration of the objective lens driving apparatus according to a second embodiment.

FIG. 7 is a perspective view illustrating the general configuration of the objective lens driving apparatus 21 according to a second embodiment.

Figure 8:
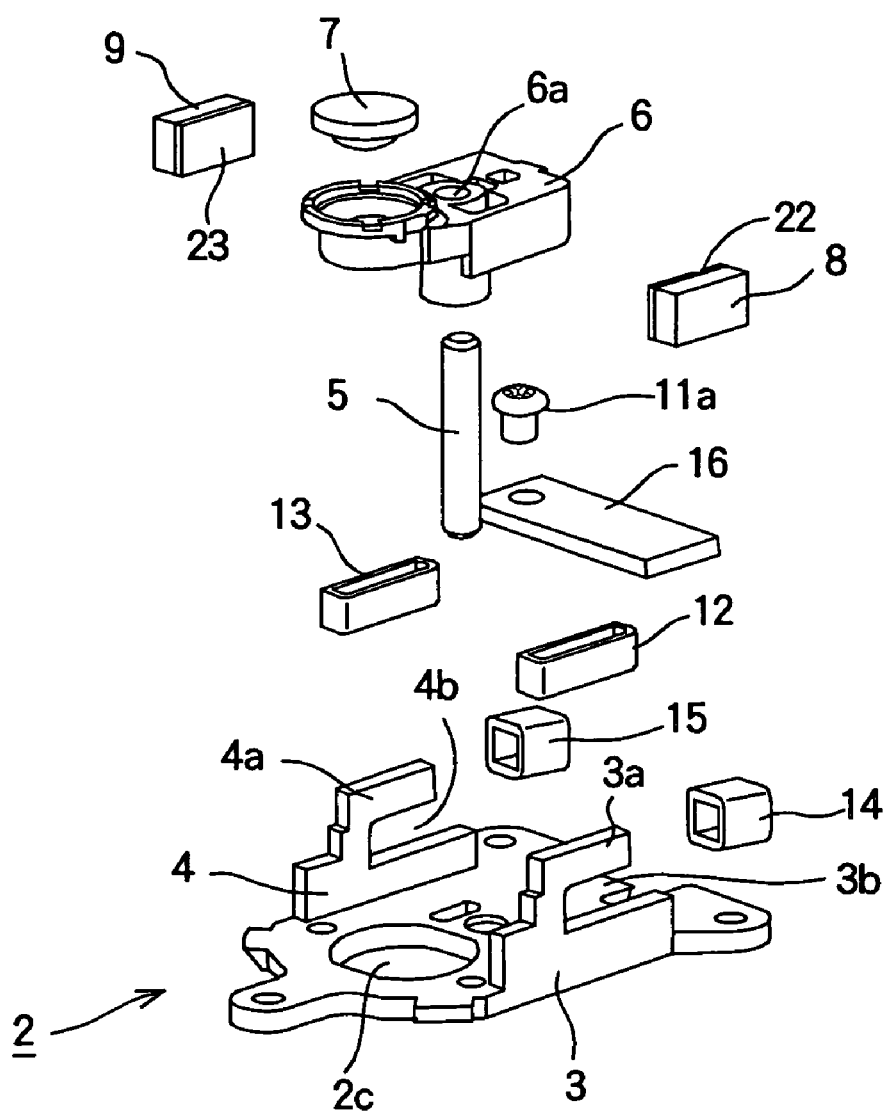
FIG. 8 is an exploded perspective view of the objective lens driving apparatus shown in FIG. 7.

FIG. 8 is an exploded perspective view of the objective lens driving apparatus shown in FIG. 4.

Figure 9:
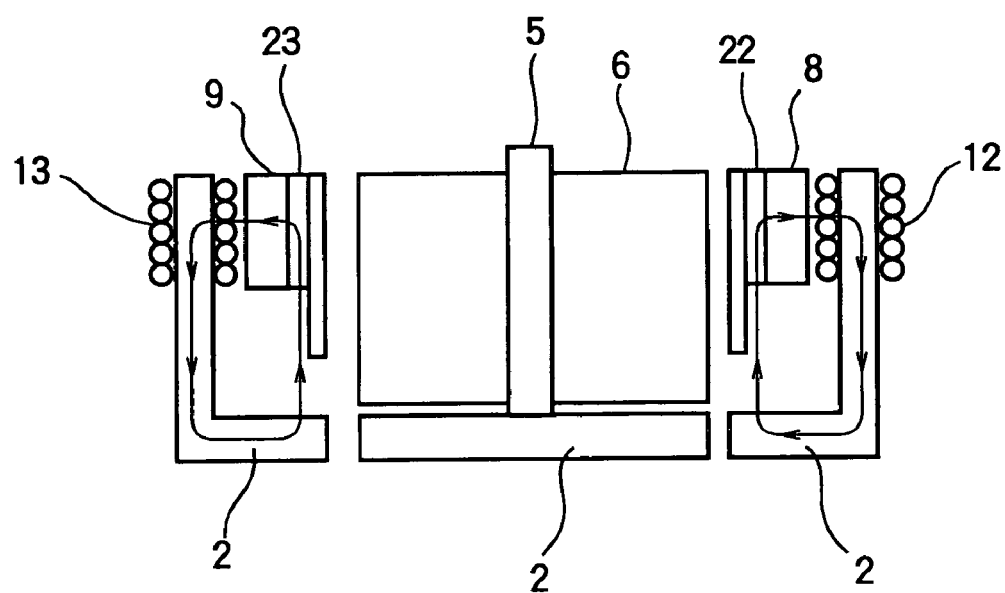
FIG. 9 illustrates a magnetic circuit of the second embodiment.

FIG. 9 illustrates a magnetic circuit of the second embodiment.

The second embodiment differs from the first embodiment in that plate-like yokes are employed in place of the yoke having magnetic paths. Elements similar to those in the first embodiment have been given the same reference numerals and the description thereof is omitted.

The plate-like yokes 22 and 23 are made of a magnetic material and are integrally fixed to the lens holder together with the magnets 8 and 9. The plate-like yoke 22 is between the magnet 8 and the lens holder 6 and the plate-like yoke 23 is between the magnet 9 and the lens holder 6, respectively. Thus, a magnetic circuit that includes the long portion of the coil-supporting yoke 3a, base 2, and plate-like yoke 22 is defined around the magnet 8. In FIG. 9, the tracking coils 14 and 15 are omitted for simplicity. Also, a magnetic circuit that includes the long portion of the coil-supporting yoke 4a, base 2, and plate-like yoke 23 is defined around the magnet 9.

The operation and advantages of the second embodiment of the aforementioned configuration are the same as the first embodiment and therefore the description thereof is omitted. The second embodiment has been described with respect to the plate-like yokes 22 and 23 that are first fixed to the magnets 8 an 9, respectively, and then assembled to the lens holder 6. Instead, the yokes 22 and 23 may be formed in integral with the lens holder 6 in advance.

Third Embodiment

Figure 10:
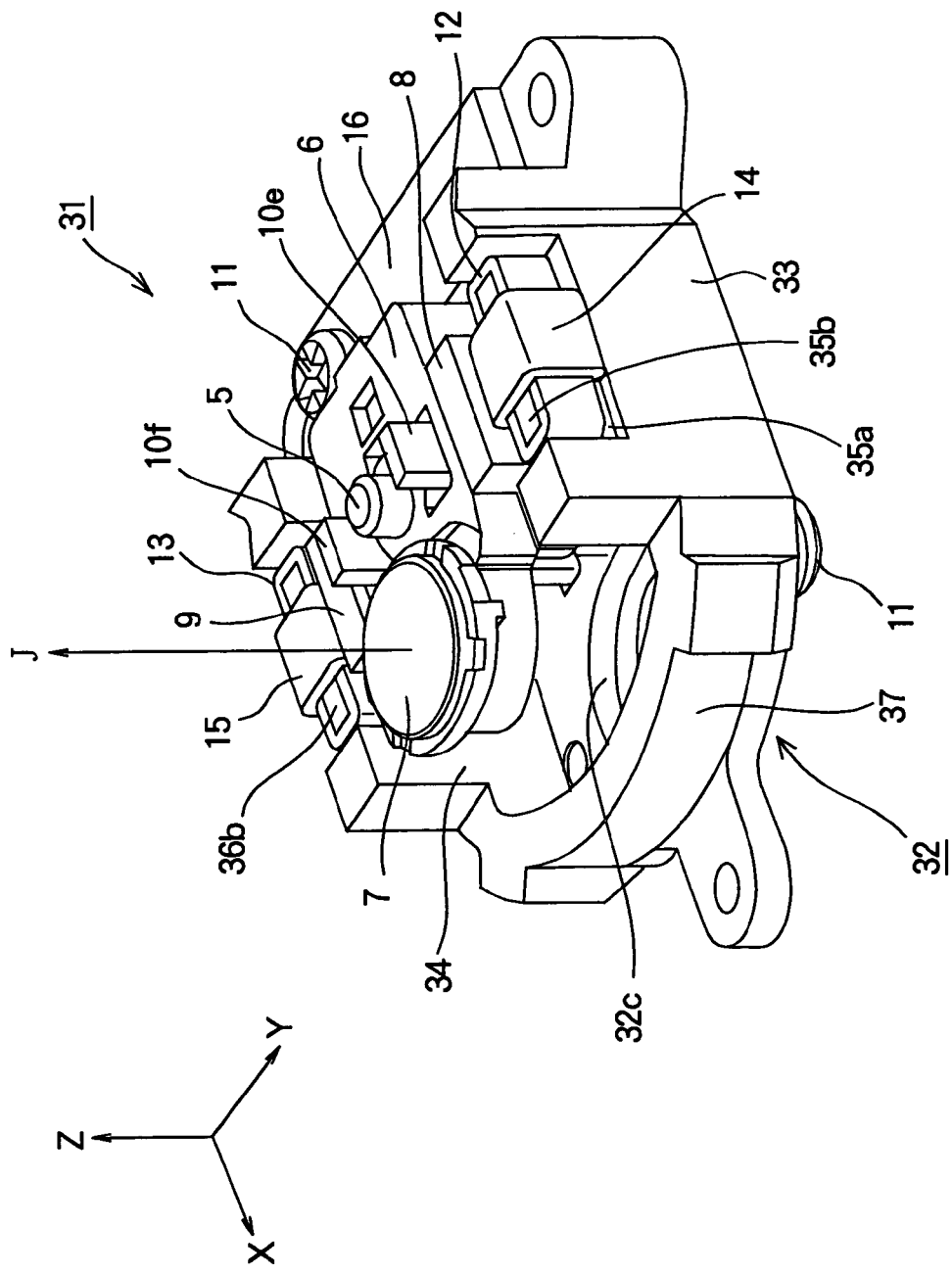
FIG. 10 is a perspective view, illustrating a general configuration of the objective lens driving apparatus according to a third embodiment.

FIG. 10 is a perspective view, illustrating a general configuration of the objective lens driving apparatus according to a third embodiment.

Figure 11:
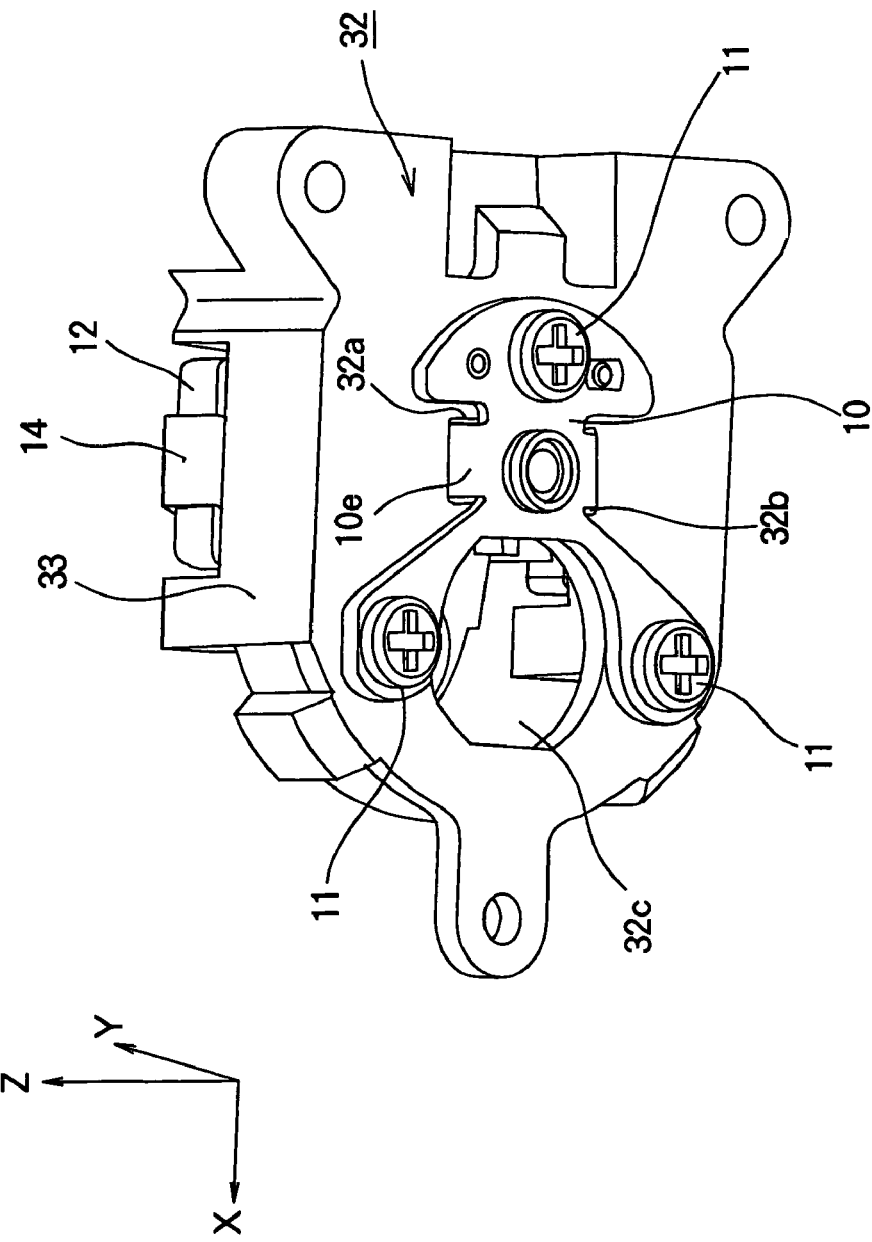
FIG. 11 is a perspective view, illustrating the bottom portion of the apparatus shown in FIG. 10.

FIG. 11 is a perspective view, illustrating the bottom portion of the apparatus shown in FIG. 10.

The third embodiment differs from the first embodiment in that a base 32 is used in place of the base 2. Elements similar to those in the first embodiment have been given the same reference numerals and the description thereof is omitted.

Referring to FIGS. 10 and 11, a Z-axis is a direction parallel to the shaft 5, an X-axis is a direction perpendicular to the Z-axis, and a Y-axis is a direction perpendicular to both the X-axis and Z-axis. The base 32 is made of highly rigid engineering plastics such as polyphenylene sulfide (referred to PPS hereinafter) or a non-magnetic material such as aluminum. The base 32 is coated with fluoroplastics having a small friction coefficient so that the lens holder 6 can rotate smoothly on the base 32. The base 2 has side walls 33 and 34 at opposite ends and a supporting shaft 5 extends from a middle of the base 2 between the side walls 33 and 34.

A lens holder 6 is made of a lightweight, highly rigid plastics material, and has a bearing hole 6a (FIG. 12) formed in the middle thereof through which the supporting shaft 5 extends upwardly and is rotatably supported by the base 32. The lens holder 6 supports an objective lens 7 at a position eccentric to the shaft 5 in such a way that the optical axis of the objective lens 7 is parallel to the Z-axis.

When the lens holder 6 is at its neutral position, the optical axis of the objective lens 7 and the rotational axis (i.e., the shaft 5) of the objective lens 7 lie in a plane parallel to the X-axis.

The base 32 has an opening 32c formed therein through which abeam of light emitted from a light source, not shown, passes toward the objective lens 7. The opening 32c is larger than an area in which the objective lens 7 moves in an X-Y plane. A relay terminal board 16 is fixedly mounted to the portions 38 and 39 of the base 32 by means of a screw 11a. The relay terminal board 16 relaying the electrical connection of lead lines from the focusing coils 12 and 13 and tracking coils 14 and 15.

The light emitted from the light source passes through the opening 32c and enters the objective lens 7 in a direction as shown by arrow J in FIG. 10. The objective lens 7 focuses the light on the recording surface of the optical recording medium, not shown, disposed above the objective lens 7, thereby forming a spot of light on the recording surface. The optical recording medium is positioned such that when the grooves or pits formed in the rotating recording medium pass the optical axis of the objective lens 7, the direction of circumferential velocity of the track of the grooves or pits is substantially parallel to the X-axis.

Figure 12:
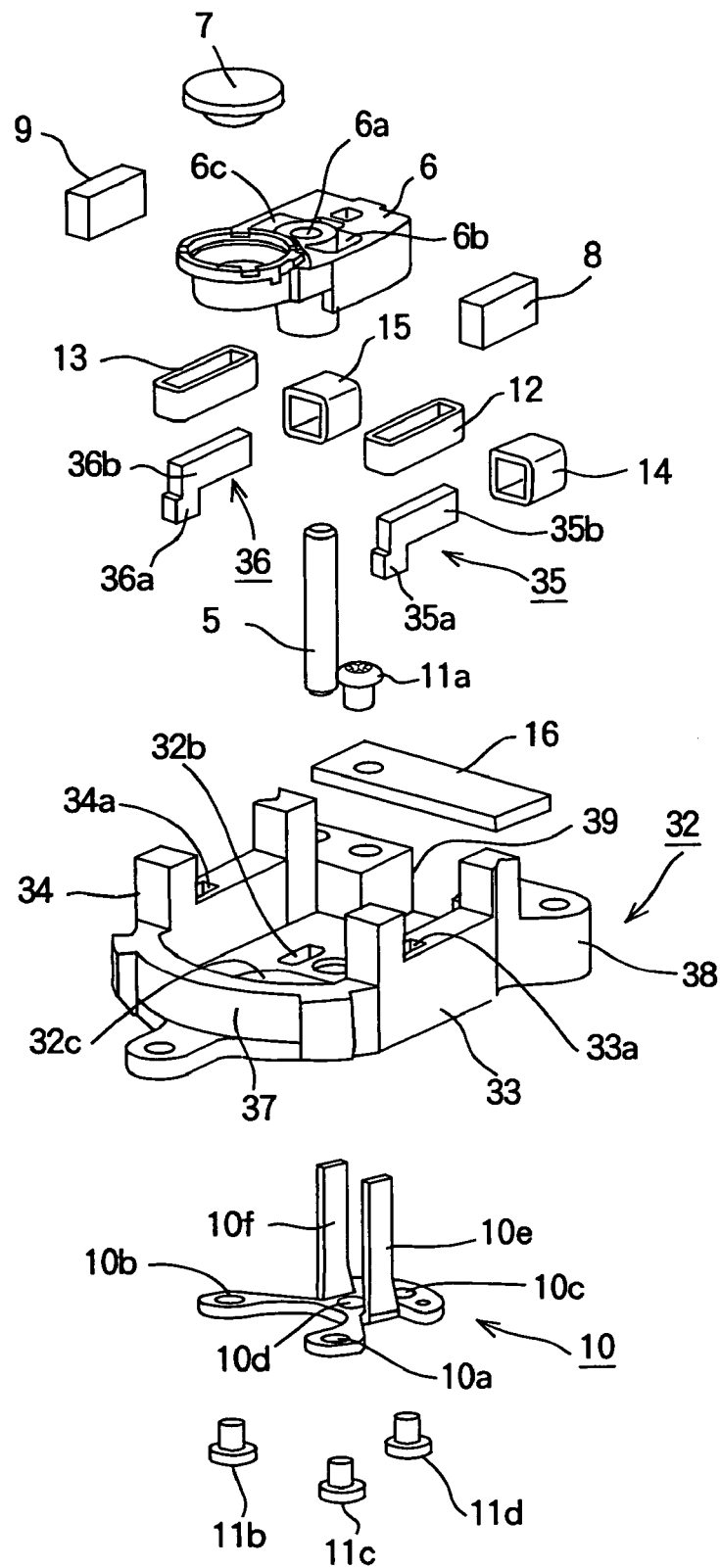
FIG. 12 is an exploded perspective view, illustrating various components of the objective lens driving apparatus shown in FIG. 10.

FIG. 12 is an exploded perspective view, illustrating various components of the objective lens driving apparatus shown in FIG. 10.

Referring to FIG. 8, holes 33a and 34a are formed in the recessed top surfaces of the side walls 33 and 34, respectively. The holes 33a and 34a are used to mount the coil-supporting yokes 35 and 36 to the base 32. The coil-supporting yokes 35 and 36 are generally L-shaped magnetic members and have long portions 35b and 36b, respectively.

A yoke 10 is made of a magnetic material and has a base and a pair of magnetic paths 10e and 10f that extend from the base portion of the yoke 10 and oppose each other. The base has screw holes 10a–10c and a positioning hole 10d formed therein. The magnetic paths 10e and 10f are assembled in such a way that the magnetic paths 10e and 10f extend through openings 32a and 32b (FIG. 11) formed in the base 32 and clearance holes 6b and 6c formed in the lens holder 6, respectively. Each of the magnetic paths 10e and 10f is fixed to the outer bottom surface of the base 32 by means of three screws 11b–11d.

Figure 13:
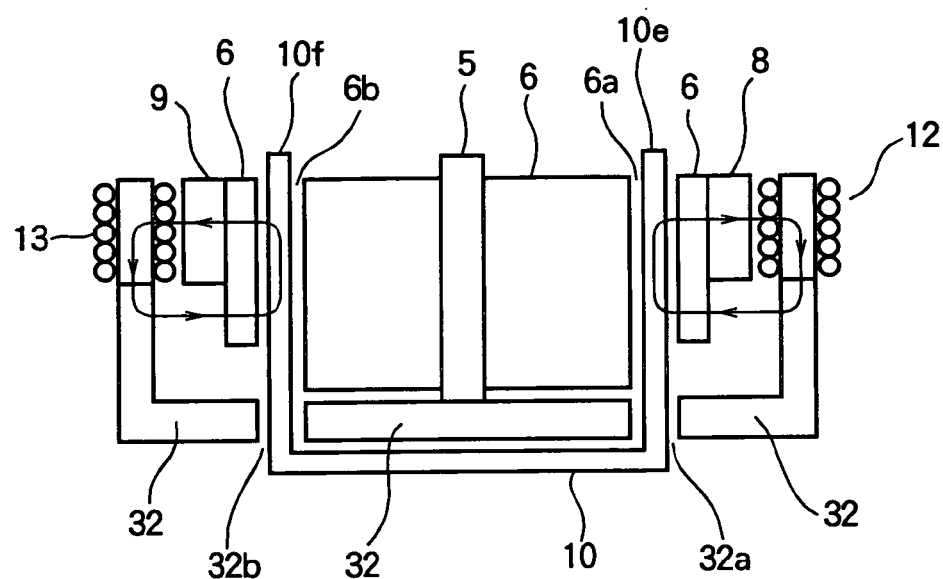
FIG. 13 illustrates a magnetic circuit of the third embodiment.

FIG. 13 illustrates a magnetic circuit of the third embodiment.

As shown in FIG. 13, upon attaching the yoke 10 to the base 32, the coil-supporting yoke 35 (FIG. 14) and magnetic path 10e form a magnetic circuit that surrounds the magnet 8. In FIG. 13, the tracking coils 14 and 15 are omitted for simplicity. Also, the coil-supporting yoke 36 (FIG. 14) and magnetic path 10f form another magnetic circuit that surrounds the magnet 9.

Figure 14:
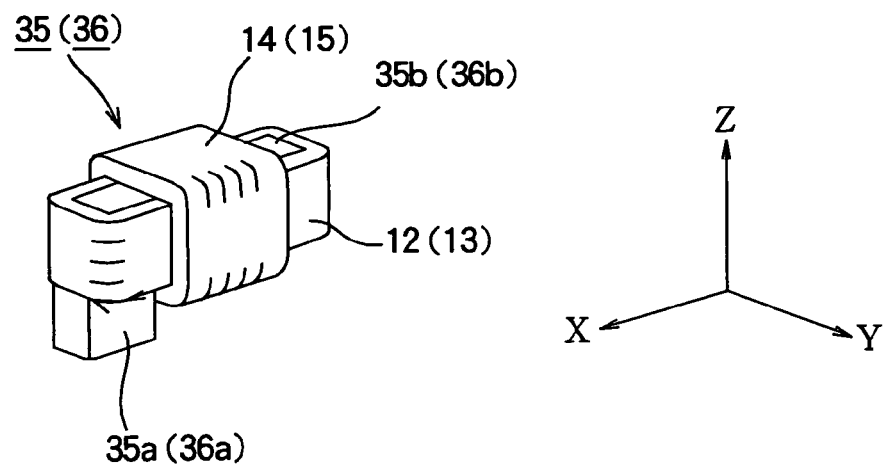
FIG. 14 illustrates a focusing coil and tracking coil mounted on a yoke.

FIG. 14 illustrates a focusing coil and tracking coil mounted on a coil-supporting yoke 35.

Referring to FIG. 14, the focusing coils 12 and 13 are wound on the long portions 35b and 36b of coil-supporting yokes 35 and 36, respectively, and tracking coils 14 and 15 are wound on the focusing coils 12 and 13, respectively.

The coil-supporting yokes 35 and 36 are assembled to the base 32 with the portions 35a and 36a press-fitted into the holes 33a and 34a formed in the side walls 33 and 34, respectively. The coil-supporting yokes 35 and 36 are received in the recesses formed in the top surfaces of the side walls 33 and 34, respectively, while also extending in a direction parallel to the X-axis with a predetermined clearance formed between the top surfaces of the recesses.

The focusing coils 12 and 13 are wound on the coil-supporting yokes 35 and 36, respectively, in such a way that the focusing coils 12 and 13 are wound about axes parallel to the Z-axis. The tracking coils 14 and 15 are wound on the focusing coils 12 and 13, respectively, in such a way that the tracking coils 14 and 15 are wound about axes parallel to the X-axis.

Referring back to FIG. 10, each of the magnets 8 and 9 exerts an attraction force on a corresponding one of the pair of the coil-supporting yokes 35 and 36, so that the lens holder 6 is urged both in a direction parallel to the X-axis and in the Z-axis. Thus, at the neutral position, the lens holder 6 is urged by an X-axis component of the resultant force of two forces: the force acting between the magnet 8 and the coil-supporting yoke 35 and the force acting between the magnet 9 and the coil-supporting yoke 36.

Also, at the neutral position, a balance is achieved between the weight of the lens holder 6 and a component in the Z-axis of the resultant force of the attraction forces acting between the magnet 8 and coil-supporting yoke 35 and between the magnet 9 and coil-supporting yoke 36.

{Operation}

The operation for returning the lens holder to the neutral position will be described.

When the lens holder 6 displaces from the neutral position in the Z-axis for some reason, a force tending to return to the neutral position is generated in accordance with a change in the magnetic field in the magnetic circuit.

When the lens holder 6 rotates from the neutral position in directions shown by arrows A and B about the Z-axis, a change in the magnetic field in the magnetic circuit creates a force in accordance with the amount of rotation of the lens holder 6. This force causes the lens holder 6 to return to the neutral position.

The characteristic of this force depends greatly on the shape and position of the coil-supporting yokes 35 and 36 formed in the side walls 33 and 34, respectively. Thus, the shape and position of the coil-supporting yokes 35 and 36 are selected such that when the focusing of the objective lens 7 is corrected, the force acting on the lens holder 6 varies linearly within the range (usually ±1 mm) in which the objective lens 7 should move in the Z-axis. Also, the shape and position of the coil-supporting yokes 35 and 36 are selected such that when the tracking of the objective lens 7 is corrected, the force acting on the lens holder 6 varies linearly within the range (usually ±0.5 mm) in which the objective lens 7 should move.

As described above, when no external force is applied to the lens holder 6, the lens holder 6 is urged somewhat in the negative X-axis but remains balanced at the neutral position. This urging force in the X-axis presses the inner wall of the bearing 6a against the shaft 5, preventing a gap from being created between the bearing hole 6a and the shaft 5. Thus, the rattling of the lens holder 6 is minimized when the lens holder 6 rotates.

The focusing operation and tracking operation in the third embodiment are the same as those in the first embodiment and its description is omitted.

As described above, the magnetic circuit formed of the magnet 8 and 9, coil-supporting yokes 35 and 36, and the yoke 10 operates to support the objective lens 7 of the movable magnet type at its neutral position. The use of a magnetic force eliminates separate components such as supporting springs of the conventional art, thereby reducing the number of components as well as facilitating the assembly of the apparatus.

The bearing hole 6a formed in the lens holder 6 is pressed against the shaft 5 by the magnetic force. This makes the lens holder 6 rattle-free, so that the lens holder 6 (i.e., objective lens 7) will not tilt and/or vibrate.

The base 32 can be made of a non-magnetic material such as plastics that can be machined easily. Therefore, the rigidity of the base can be increased by forming a wall in such a way that the wall surrounds substantially the whole circumference of the base, thereby preventing unwanted vibration of the structure.

The base 32 may have projections formed on the top surfaces of the side walls 33 and 34 so that a coil assembly of the coils 12 (13) and 14 (15) is received between the projections. The gaps between the coil assembly and projections are filled with an adhesive for securely mounting the coils to the base 32. Thus, when the lens holder is driven, a reaction force will not cause the focusing coils 12 and 13 and the tracking coils 14 and 15 to vibrate.

In the third embodiment, the focusing coils 12 and 13 and tracking coils 14 and 15 are fixed to the coil-supporting yokes 35 and 36 by an adhesive. Alternatively, the assembly may be replaced by a composite component where the focusing coils and tracking coils are directly wound on the coil-supporting yokes.

Fourth Embodiment

Figure 15:
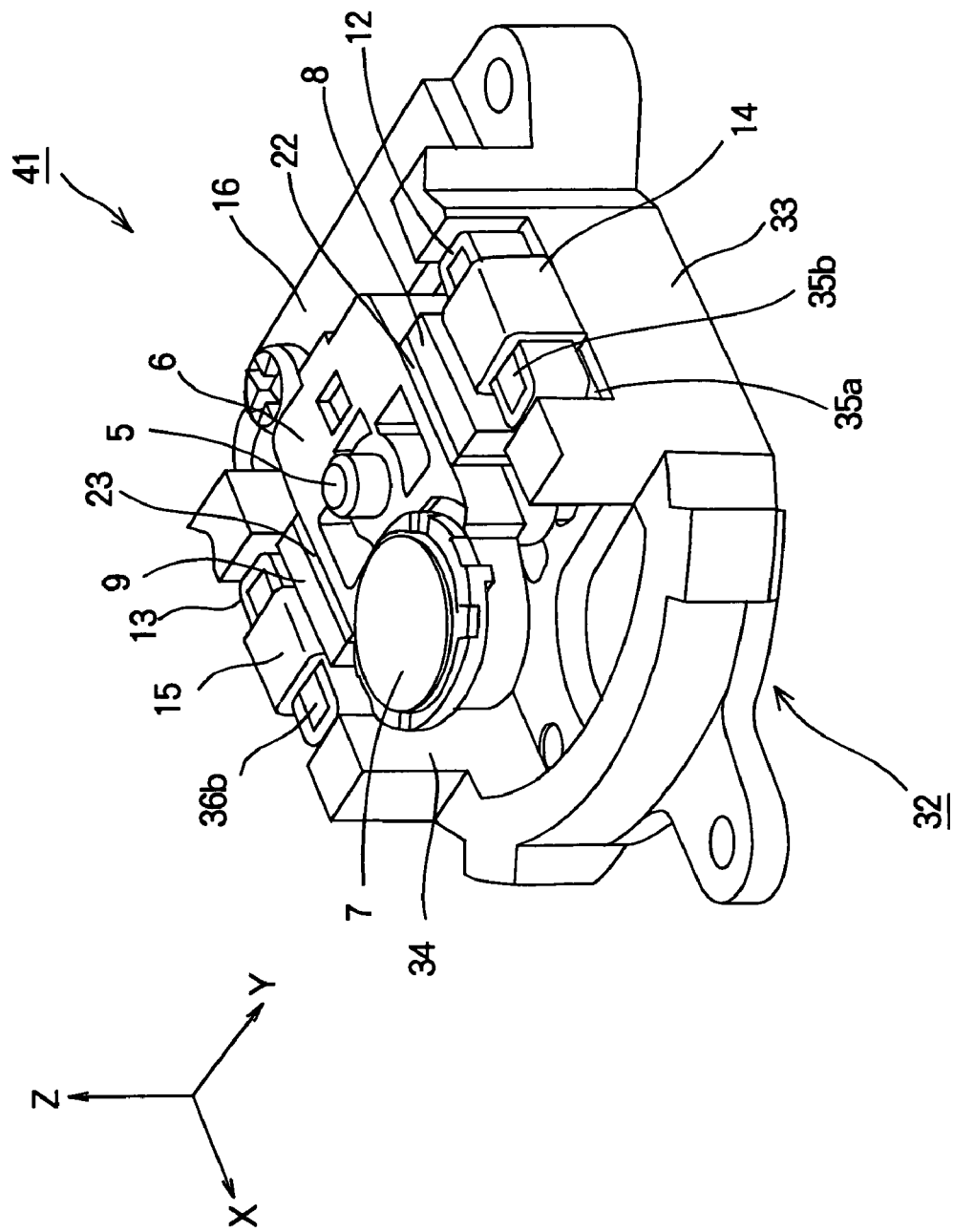
FIG. 15 is a perspective view, illustrating the configuration of an objective lens driving apparatus 41 according to a fourth embodiment.

FIG. 15 is a perspective view, illustrating the configuration of an objective lens driving apparatus 41 according to a fourth embodiment.

Figure 16:
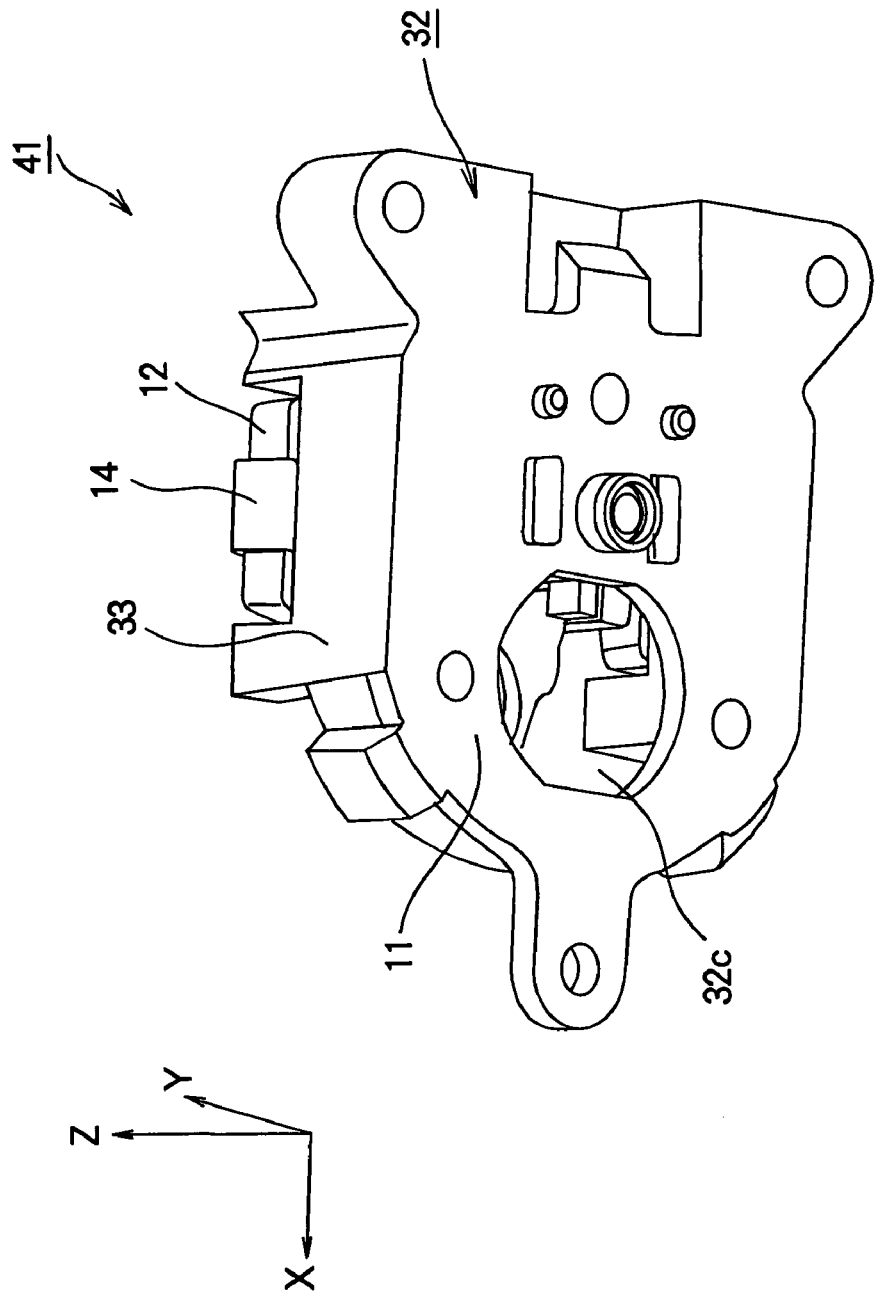
FIG. 16 is a perspective view, illustrating the bottom portion of the objective lens driving apparatus.

FIG. 16 is a perspective view, illustrating the bottom portion of the objective lens driving apparatus 41.

Figure 17:
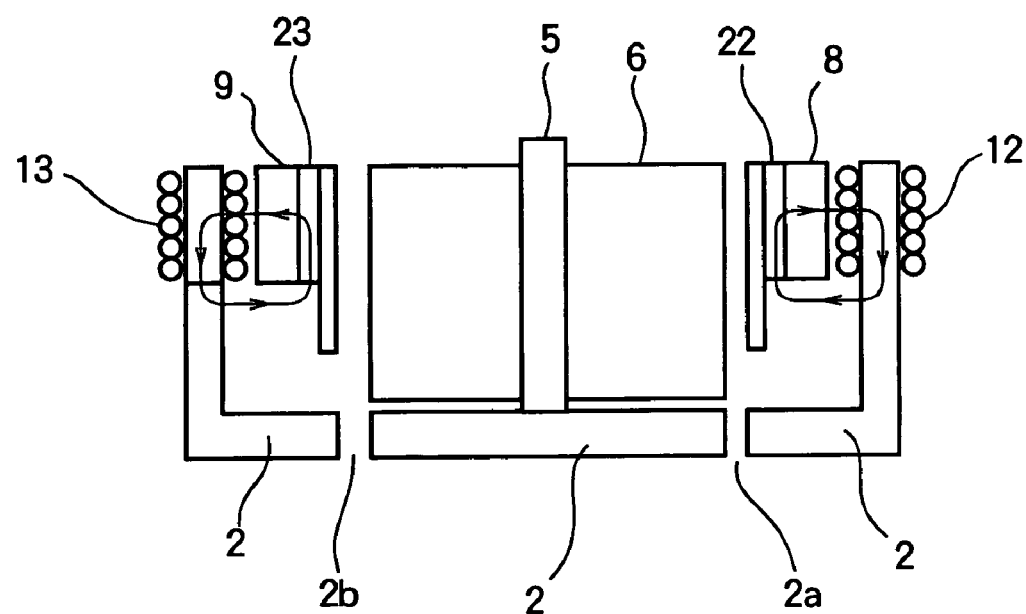
FIG. 17 illustrates a magnetic circuit of the fourth embodiment.

FIG. 17 illustrates a magnetic circuit of the fourth embodiment.

The fourth embodiment differs from the third embodiment in that plate-like yokes 22 and 23 are employed in place of the yoke 10. Elements similar to those in the third embodiment have been given the same reference numerals as the third embodiment and the description thereof is omitted.

The plate-like yokes 22 and 23 are made of a magnetic material and are integrally fixed to the lens holder 6 together with the magnets 8 and 9. The plate-like yoke 22 is between the magnet 8 and the lens holder 6 and the plate-like yoke 23 is between the magnet 9 and the lens holder 6, respectively. Thus, a magnetic circuit is defined around the magnet 8 by the long portion of the coil-supporting yoke 35 (FIG. 14) and the plate-like yoke 22. As shown in FIG. 17, a magnetic circuit is defined around the magnet 9 by the long portion of the coil-supporting yoke 36 (FIG. 14) and the plate-like yoke 23. In FIG. 17, the tracking coils 14 and 15 are omitted for simplicity.

The aforementioned configuration provides the same operation and advantages as the third embodiment, and the description thereof is omitted.

Fifth Embodiment

Figure 18:
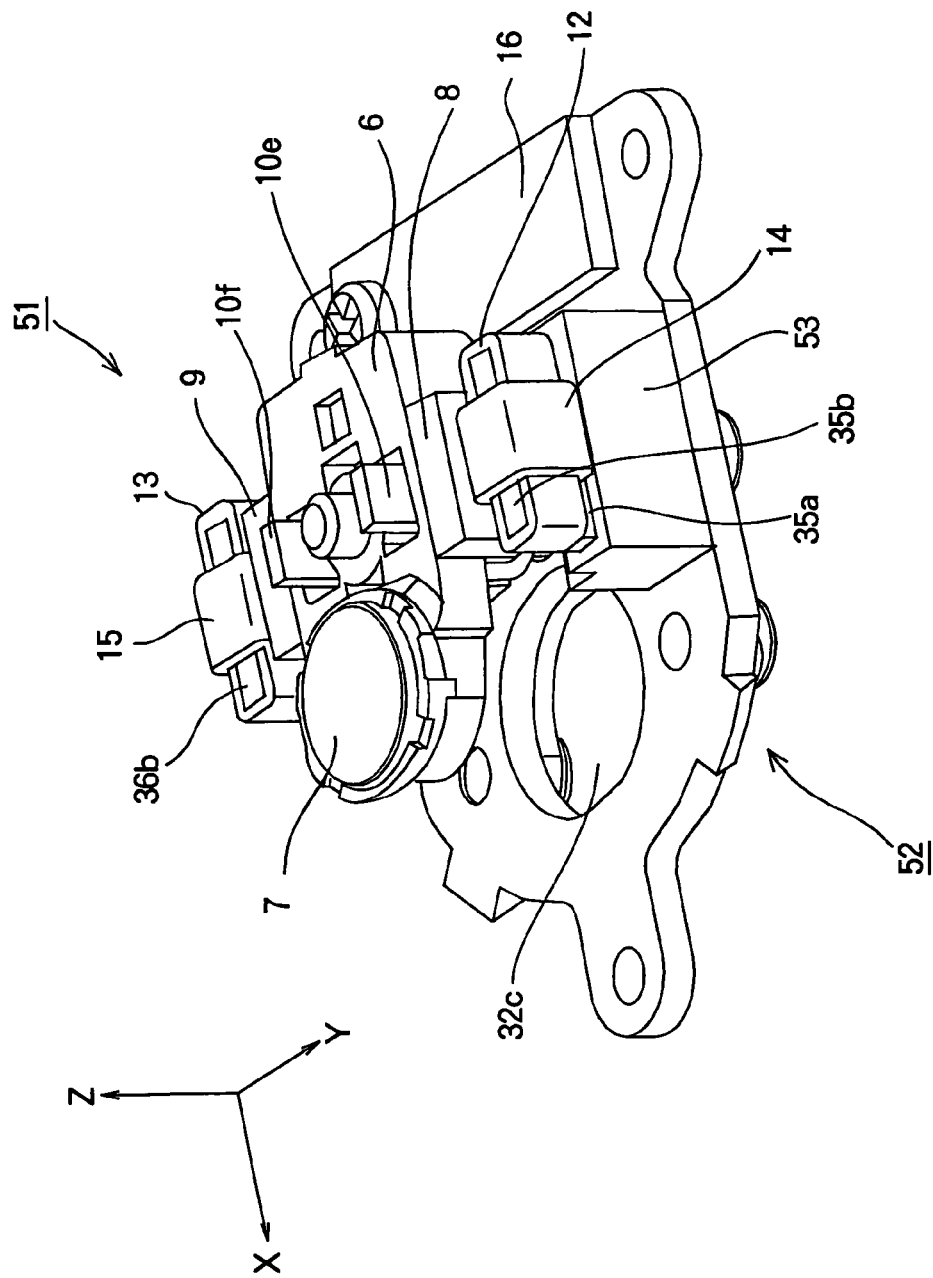
FIG. 18 is a perspective view, illustrating the configuration of an object driving apparatus 51 according to a fifth embodiment.

FIG. 18 is a perspective view, illustrating the configuration of an object driving apparatus 51 according to a fifth embodiment.

Figure 19:
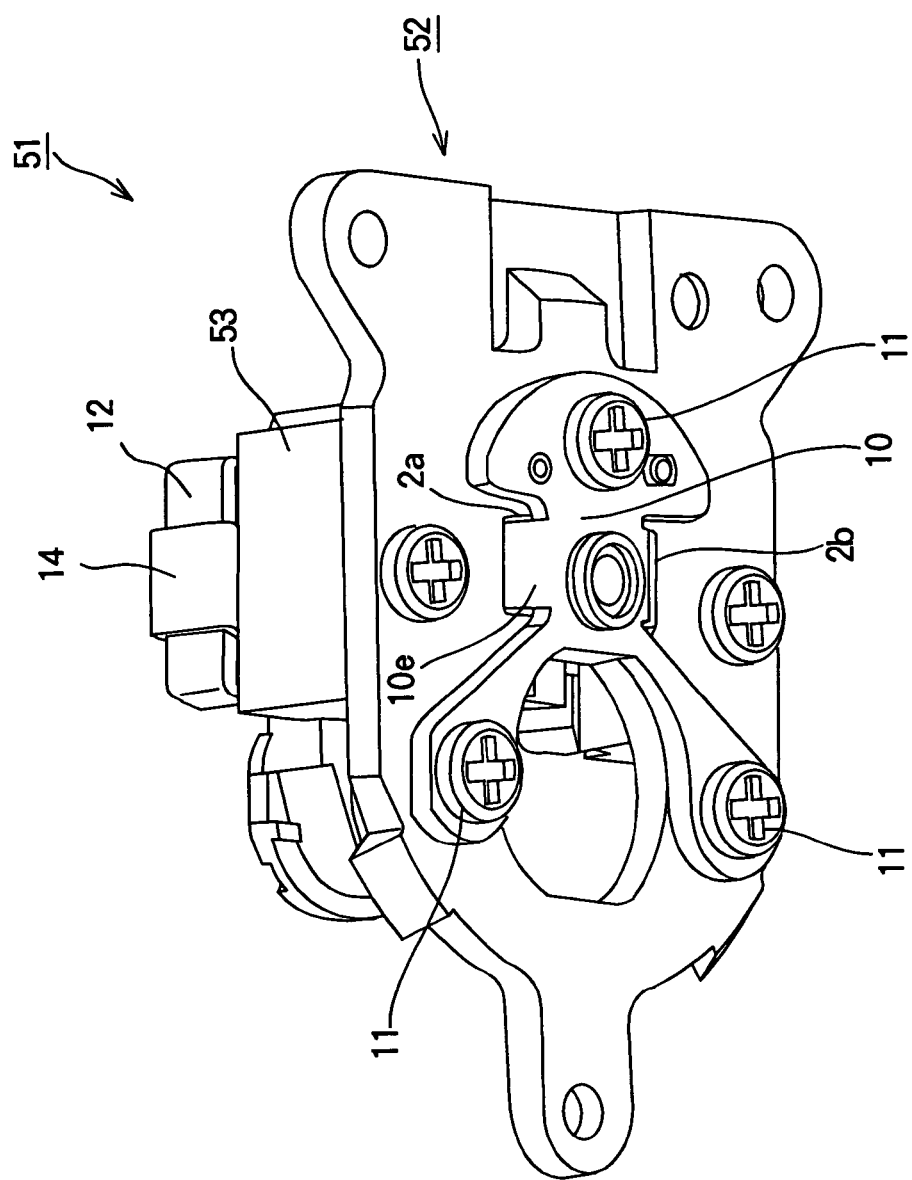
FIG. 19 is a perspective view, illustrating the bottom of the apparatus shown in FIG. 12.

FIG. 19 is a perspective view, illustrating the bottom portion of the apparatus shown in FIG. 12.

FIG. 20 is an exploded perspective view of the apparatus shown in FIG. 18.

The fifth embodiment differs from the first embodiment in that the focusing coils 12 and 13 and tracking coils 14 and 15 are mounted on a base 52 differently. Elements similar to those in the first embodiment have been given the same reference numerals and the description thereof is omitted.

A Z-axis is a direction parallel to the shaft 5, an X-axis is a direction parallel to the Z-axis, and a Y-axis is a direction perpendicular to the X-axis and Z-axis.

Referring to FIG. 18, the base 52 is made of a magnetic material and coated with fluoroplastics having a small friction coefficient. The base 52 has a supporting shaft 5 extends from a middle of the base 2. The base 52 includes yoke-carrying members 53 and 54 (FIG. 20) that are made of highly rigid engineering plastics such as PPS or a non-magnetic material such as aluminum.

Holes 53a and 54a are formed in the top surfaces of the yoke-carrying members 53 and 54, respectively. The coil-supporting yokes 35 and 36 in the fourth embodiment are the same as the coil-supporting yokes 35 and 36 in the third embodiment and therefore the description thereof is omitted.

The coil-supporting yokes 35 and 36 are assembled to the base 52 with their short portions 35a and 36a press-fitted into the holes 53a and 54a, respectively, which are formed in the yoke-carrying members 53 and 54, respectively. Upon assembling the coil-supporting yokes 35 and 36 to the base 52, long free portions 35b and 36b extend in a direction parallel to the X-axis with a predetermined clearance between the top surfaces of the recesses.

Figure 21:
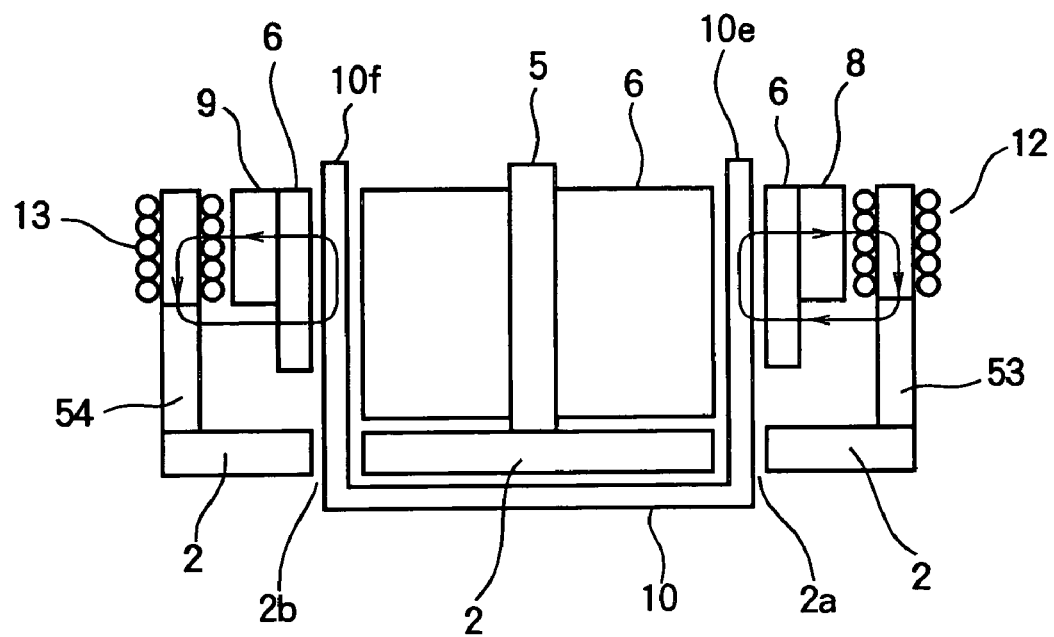
FIG. 21 illustrates a magnetic circuit of the fifth embodiment.

FIG. 21 illustrates a magnetic circuit of the fifth embodiment.

In the aforementioned configuration, the positional relation among the coil-supporting yokes 35 and 36 and the magnets 8 and 9 disposed on the lens holder 6 are the same as that in the third embodiment and the description thereof is omitted.

Thus, a magnetic circuit including the long portion of the coil-supporting yoke 35, base 52, and plate-like magnetic path 10e is defined around the magnet 8. Also, a magnetic circuit including the long portion of the coil-supporting yoke 36, base 52, and plate-like magnetic path 10f is defined around the magnet 9. In FIG. 21, the tracking coils 14 and 15 are omitted for simplicity.

The lens holder 6 is urged in a negative X-axis by a component in the X-axis of the resultant force of an attraction force acting between the magnet 8 and the coil-supporting yoke 35 and an attraction force acting between the magnet 9 and the coil-supporting yoke 36.

At the neutral position, a balance is achieved between the weight of the lens holder 6 and a component in the Z-axis of the resultant force of the attraction forces acting between the magnet 8 and the coil-supporting yoke 35 and between the magnet 9 and coil-supporting yoke 36. When the lens holder 6 displaces from the neutral position in the Z-axis for some reason, a force tending to return to the neutral position is generated in accordance with a change in the magnetic field in the magnetic circuit.

When the lens holder 6 rotates from the neutral position in directions shown by arrows A and B about the Z-axis, a change in the magnetic field in the magnetic circuit creates a force in accordance with the amount of rotation of the lens holder 6. This force causes the lens holder 6 to return to the neutral position.

The characteristic of this force depends greatly on the shape and position of the coil-supporting yokes 35 and 36 placed on the yoke-carrying members 53 and 54. The shape and position of the coil-supporting yokes 35 and 36 are selected such that when the focus error of the objective lens 7 is corrected, the force varies linearly in the range (usually ±1 mm) in which the objective lens 7 should move. Also, the shape of the long free portions of the coil-supporting yokes 3a and 4a are selected such that when the tracking error of the objective lens 7 is corrected, the force varies linearly in the range (usually ±0.5 mm) in which the objective lens 7 should move.

With the aforementioned configuration, the control operations for focusing correction and tracking correction are the same as those in the third embodiment and the detailed description thereof is omitted.

The objective lens driving apparatus of the aforementioned configuration provides the same advantages as the first embodiment.

The fifth embodiment has been described with respect to the yoke-carrying members 53 and 54 that are fixed to predetermined positions on the base 52, respectively. Alternatively, the configuration may be modified in such a way that the through-holes 52a and 52b formed in the base 52 have slightly larger inner diameters than the outer diameters of screws, thereby allowing positional adjustment of the yoke-carrying members 53 and 54.

Such a modification allows the magnetic force acting on the magnets 8 and 9 to change, so that the magnitude of the force acting on the bearing 6a of the lens holder 6 and the neutral position of the objective lens 7 can be adjusted accordingly.

When the yoke-carrying members 53 and 54 are formed of plastics, the yoke-carrying members 53 and 54 may be insert-molded with the coil-supporting yokes 35 and 36.

Sixth Embodiment

Figure 22:
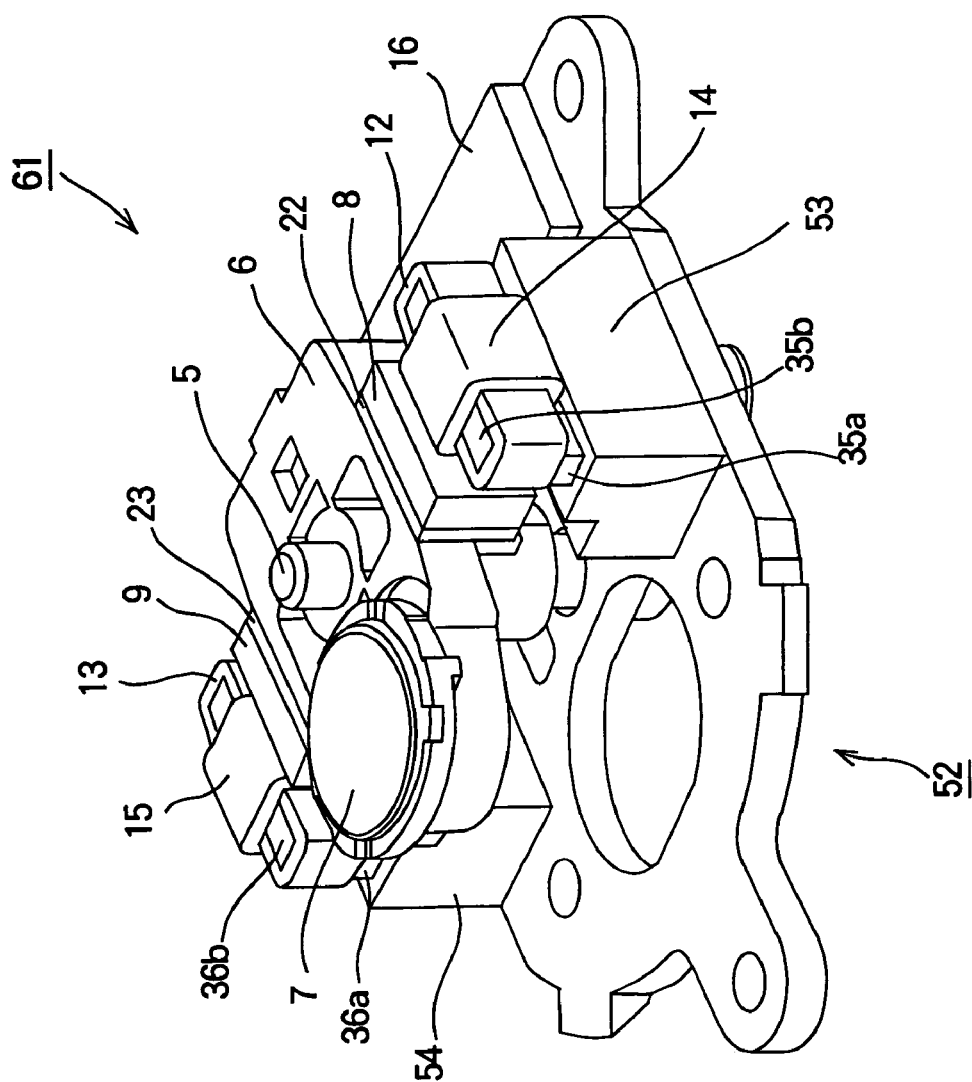
FIG. 22 is a perspective view, illustrating the configuration of an objective lens driving apparatus.

FIG. 22 is a perspective view, illustrating the configuration of an objective lens driving apparatus.

Figure 23:
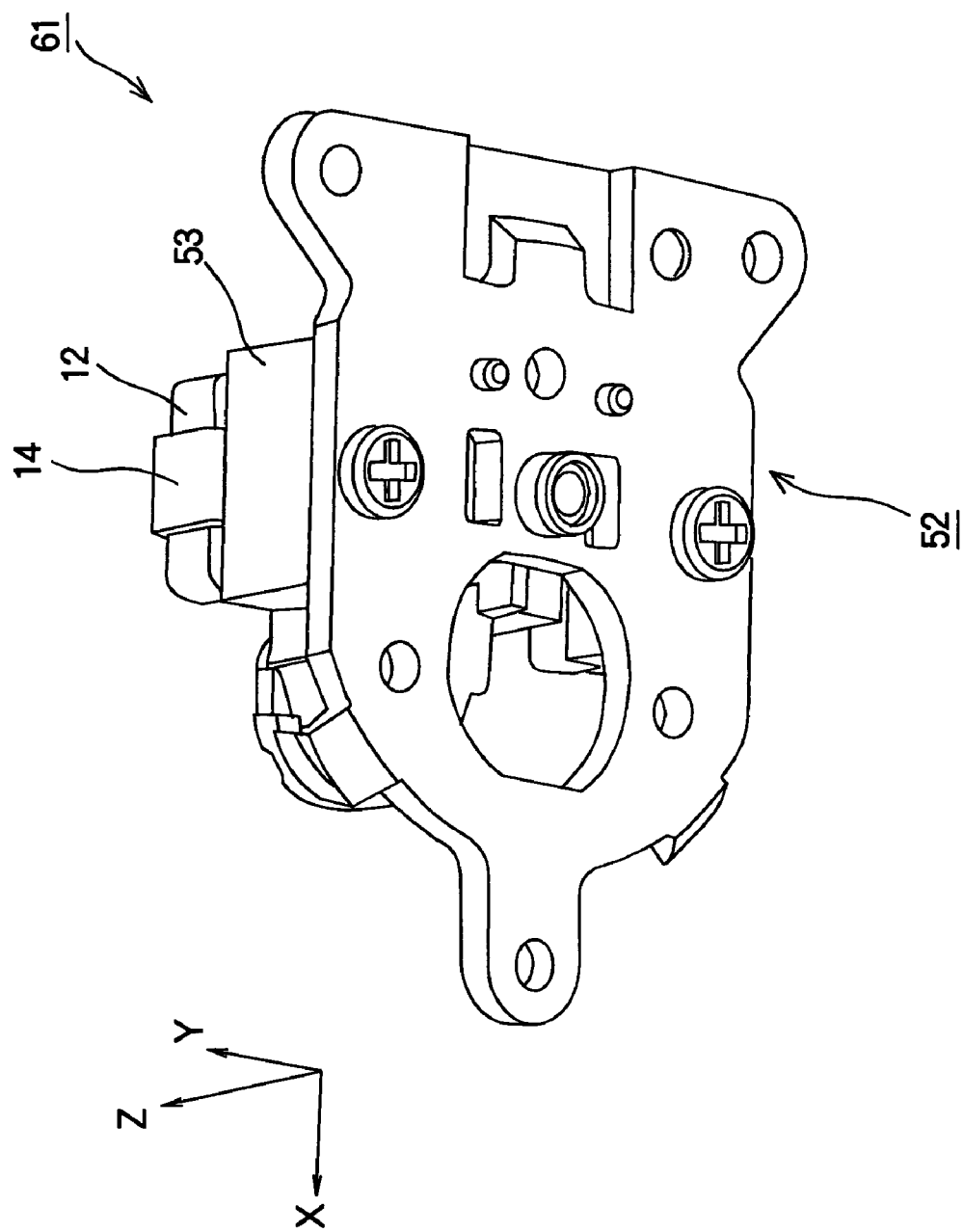
FIG. 23 is a perspective view, illustrating the bottom portion of the objective lens driving apparatus.

FIG. 23 is a perspective view, illustrating the bottom portion of the objective lens driving apparatus.

Figure 24:
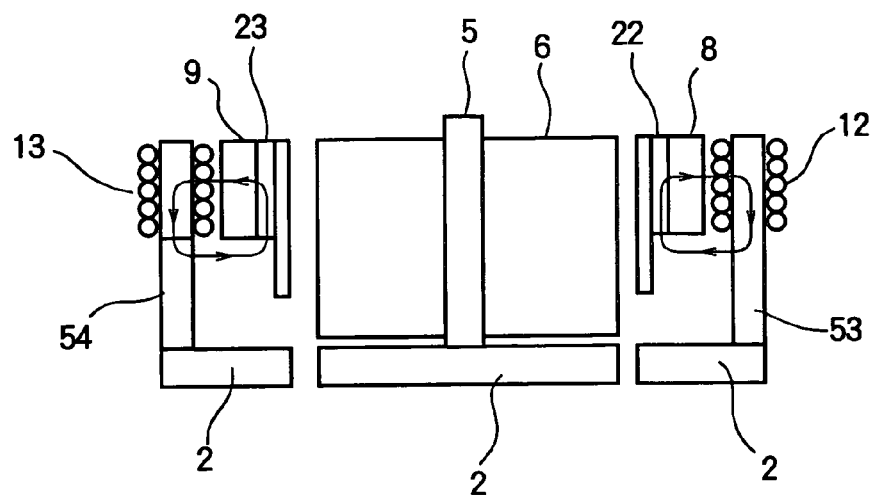
FIG. 24 illustrates a magnetic circuit of the sixth embodiment.
Figure 25:
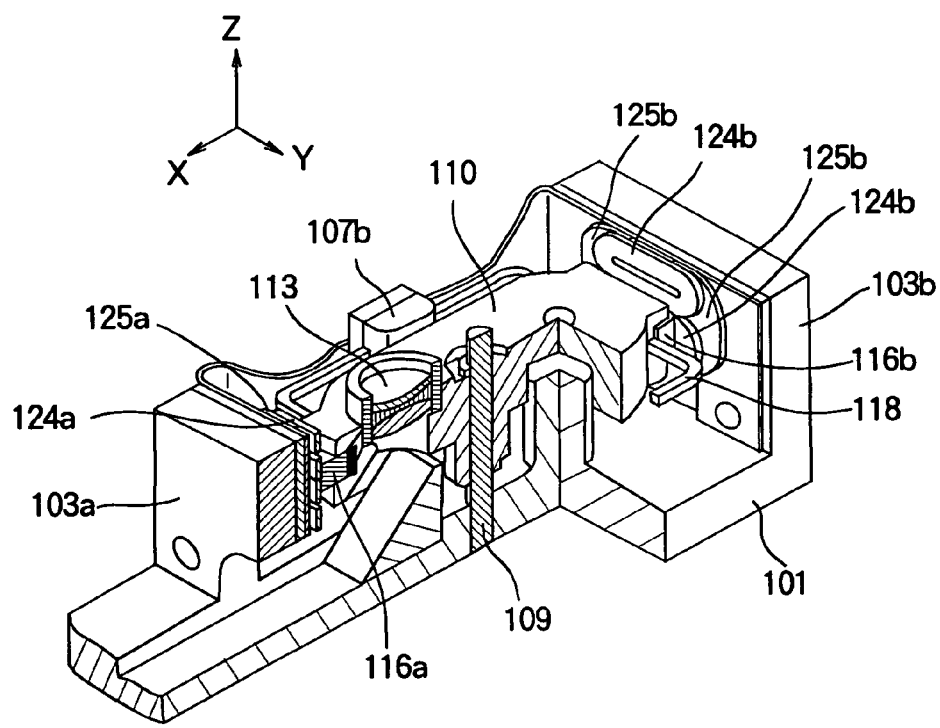
FIG. 25 is a perspective view, with a partially cutaway view, of a pertinent portion of a conventional art apparatus.

FIG. 24 illustrates a magnetic circuit of the sixth embodiment.

The sixth embodiment differs from the fifth embodiment in that plate-like yokes 22 and 23 (FIG. 18) are employed in place of the yoke 10 (FIG. 20).

The plate-like yokes 22 and 23 are made of a magnetic material and integrally fixed to the lens holder 6 together with the magnets 8 and 9. The plate-like yoke 22 is between the magnet 8 and the lens holder 6 and the plate-like yoke 23 is between the magnet 9 and the lens holder 6. Thus, the long portion of the coil-supporting yoke 35 (FIG. 14), base 52, and plate-like yoke 22 define a magnetic circuit around the magnet 8. Also, the long portion of the coil-supporting yoke 36 (FIG. 14), base 52, and plate-like yoke 23 define a magnetic circuit around the magnet 9. In FIG. 24, the tracking coils 14 and 15 are omitted for simplicity.

The operation and advantages of the aforementioned configuration are the same as those of the fifth embodiment and the description thereof is omitted. The simple configuration of the sixth embodiment is effective in reducing manufacturing cost of an objective lens driving apparatus. The sixth embodiment has been described with respect to the configuration where the plate-like yokes 22 and 23 are first fixed to magnets 8 and 9, respectively, and then assembled to the lens holder 6. The yokes 22 and 23 may also be formed integrally with the lens holder 6.

While the magnets 8 and 9 have flat surfaces that face the coils, the surfaces may also be curved surfaces concentric to the shaft 5, in which case, the surfaces of the coil-supporting yokes 3a and 4a (FIG. 3) on which the respective coils are mounted may also be curved surfaces concentric to the shaft 5, and the surfaces of the coil-supporting yokes 36 and 36 that face the magnets 8 and 9 may also be curved surfaces concentric to the shaft 5.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An objective lens driving apparatus, comprising:
an objective lens that focuses light emitted from a light source on an information-recording medium;
a lens-holder that holds said objective lens thereon, said lens-holder having two first holes that extend through the lens-holder in a direction substantially parallel to an optical axis of the objective lens and being movable in such a direction that said objective lens moves in a direction substantially perpendicular to said optical axis of said objective lens, said lens-holder also being movable in a direction of the optical axis of said objective lens;
a first magnetic path member having two first opposing walls;
a second magnetic path member having two second opposing walls and a first bottom wall that connects the second opposing walls; and
a drive mechanism having a magnet and a coil, one of the magnet and coil being fixedly mounted on said lens holder and the other of the magnet and coil being fixedly mounted on one of the first opposing walls,
wherein said second magnetic path member is mounted to said first magnetic path member such that the second opposing walls extend through corresponding ones of the two first holes and at least part of turns of the coil are between one of the first opposing walls and one of the second opposing walls.

2. The apparatus according to claim 1, wherein the first magnetic path member has a second bottom wall and two second holes formed in the first bottom wall, the second bottom wall connecting the first opposing walls and contacting the first bottom wall,
wherein the second opposing walls extend through corresponding ones of the two second holes.

3. The apparatus according to claim 2, wherein said first magnetic path member has a larger thickness than said second magnetic path member.

4. The apparatus according to claim 3, wherein the magnet is mounted on the lens holder and the coil is mounted on one of said first opposing walls.

5. The apparatus according to claim 2, wherein the magnet is mounted on the lens holder and the coil is mounted on one of said first opposing walls.

6. The apparatus according to claim 1, wherein said first magnetic path member has a larger thickness than said second magnetic path member.

7. The apparatus according to claim 6, wherein the magnet is mounted on the lens holder and the coil is mounted on one of said first opposing walls.

8. The apparatus according to claim 1, wherein the magnet is mounted on the lens holder and the coil is mounted on one of said first opposing walls.

* * * * *